(12) United States Patent
Minor

(10) Patent No.: US 7,309,459 B2
(45) Date of Patent: Dec. 18, 2007

(54) AZEOTROPIC COMPOSITIONS OF CYCLOPENTANE

(75) Inventor: Barbara Haviland Minor, Elkton, MD (US)

(73) Assignee: E. I. duPont deNemours and Company, Wilmington, DE (US)

(*) Notice: Subject to any disclaimer, the term of this patent is extended or adjusted under 35 U.S.C. 154(b) by 0 days.

(21) Appl. No.: 11/542,579

(22) Filed: Oct. 3, 2006

(65) Prior Publication Data

US 2007/0023729 A1    Feb. 1, 2007

Related U.S. Application Data

(62) Division of application No. 10/737,871, filed on Dec. 16, 2003, now Pat. No. 7,144,523, which is a division of application No. 08/609,183, filed on Mar. 1, 1996, now Pat. No. 6,688,118.

(51) Int. Cl.
    *C08J 9/14*    (2006.01)

(52) U.S. Cl. .................. 264/53; 524/462; 252/67; 521/131

(58) Field of Classification Search .......... 252/67, 252/68; 264/53; 521/131; 524/462
See application file for complete search history.

(56) References Cited

U.S. PATENT DOCUMENTS

| | | | |
|---|---|---|---|
| 5,096,933 A | 3/1992 | Volkert | 521/131 |
| 5,166,182 A | 11/1992 | Blanpied | 521/50 |
| 5,562,857 A | 10/1996 | Werner et al. | |
| 5,565,497 A | 10/1996 | Godbey et al. | |
| 5,605,940 A | 2/1997 | Skowronski et al. | |
| 5,672,294 A | 9/1997 | Lund et al. | |
| 5,677,358 A | 10/1997 | Lund et al. | |
| 6,514,928 B1 * | 2/2003 | Bement et al. | 510/415 |

FOREIGN PATENT DOCUMENTS

| | | |
|---|---|---|
| EP | 0 431 458 | 6/1991 |
| EP | 723989 | 7/1996 |
| JP | 2-272086 | 6/1990 |
| JP | 4-110385 | 4/1992 |
| JP | 07113098 A | 5/1995 |
| WO | WO 93/11201 | 6/1993 |
| WO | WO 94/17153 | 8/1994 |
| WO | WO 94/18282 * | 8/1994 |
| WO | WO 94/25514 | 11/1994 |
| WO | WO 95/06693 | 3/1995 |
| WO | WO 96/10062 | 4/1996 |

OTHER PUBLICATIONS

Fukushima et al., "Working Fluid Mixtures for Refrigerators and Heat Pumps", *Chemical Abstracts—Abstract 137383*, 111, No. 16, Oct. 16, 1989.
Fukushima et al., "Working Fluids for Refrigerators and Heat Pumps", *Chemical Abstracts—Abstract No. 137386*, 111, No. 16, Oct. 16, 1989.
Database WPI, AN 89-202053 and JP 01 139 678 (Asahi Glass Co. Ltd), *Derwent Publications Ltd.*, London, GB, Section Ch, Week 8928, Jun. 1, 1989.
Database WPI, AN 89-202050 and JP 01 139 675 (Asahi Glass), *Derwent Publications Ltd.*, London, GB, Week 8928, Jun. 1, 1989.
International Search Report, date of mailing: Mar. 5, 1998.

* cited by examiner

*Primary Examiner*—John R. Hardee
(74) *Attorney, Agent, or Firm*—Mary Ann Capria

(57) ABSTRACT

This invention relates to compositions of cyclopentane, and a compound selected from the group consisting of hydrofluorocarbons, hydrofluoroethers, or fluorinated sulfur compounds. Specifically these compounds may be selected from the group consisting of tetrafluoroethane, hexafluoropropane, pentafluoropropane, tetrafluoropropane, trifluoropropane, difluoropropane, octafluorobutane, hexafluorobutane, pentafluorobutane, nonafluorobutane, difluorobutane, trifluoro-2-methoxyethane and bis(pentafluoroethyl)sulfide.

The compositions, which may be azeotropic or azeotrope-like, may be used as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents or displacement drying agents.

4 Claims, 20 Drawing Sheets

AZEOTROPIC COMPOSITIONS OF CYCLOPENTANE

CROSS REFERENCE(S) TO RELATED APPLICATION(S)

This application is a divisional of application Ser. No. 10/737,871, which was allowed on Jul. 26, 2006, and which is a divisional patent application of U.S. Patent application User. No. 08/609,183, issued as U.S. Pat. No. 6,688,118.

FIELD OF THE INVENTION

This invention relates to compositions containing cyclopentane. More particularly, this invention relates to azeotropic compositions containing (1) cyclopentane and a hydrofluorocarbon; (2) cyclopentane and a hydrofluoroethers or (3) cyclopentane and a fluorinated sulfur compound. These compositions are useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CC-12) and chloro difluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable to use as a refrigerant a single fluorinated hydrocarbon or an azeotropic or azeotrope-like composition that includes one or more fluorinated hydrocarbons.

Fluorinated hydrocarbon are also useful as blowing agents in the manufacture of polyurethane, phenolic and thermoplastic foams.

Fluorinated hydrocarbons may also be used as cleaning agents or solvent to clean, for example, electronic circuit boards. It is desirable that the cleaning agents be azeotropic or azeotrope-like because in vapor degreasing operations the cleaning agent is generally redistilled and reused for final rinse cleaning.

Fluorinated hydrocarbons may also be used as propellants in aerosols, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to the discovery of compositions containing cyclopentane and tetrafluoroethane, hexafluoropropane, pentafluoropropane, tetrafluoropropane, trifluoropropane, difluoropropane, octafluorobutane, hexafluorobutane, pentafluorobutane, nonafluorobutane, difluorobutane, trifluoro-2-methoxyethane or bis(pentafluoroethyl)sulfide. Compounds useful for practicing the present invention include the following: 1,1,2,2-tetrafluoroethane (HFC-134), 1,1,2,2,3,3-hexafluoropropane (HFC-236ca), 1,1,2,2,3-pentafluoropropane (HFC-245ca), 1,1,2,3,3-pentafluoropropane (HFC-245ea), 1,1,1,2,3-pentafluoropropane (HFC-245eb), 1,1,1,3,3-pentafluoropropane (HFC-245 fa), 1,2,2,3-tetrafluoropropane (HFC-254ca), 1,1,3-trifluoropropane (HFC-263fa), 1,2-difluoropropane (HFC-272ea), 1,3-difluoropropane (HFC-272fa), 1,1,1,2,2,3,3,4-octafluorobutane (HFC-338mcc), 1,1,1,2,3,4,4,4-octafluorobutane (HFC-338mee), 1,1,1,2,2,4,4,4-octafluorobutane (HFC-338mf), 1,1,1,2,2,4-hexafluorobutane (HFC-356mcf), 1,1,1,4,4,4-hexafluorobutane (HFC-356mff), 1,1,1,3,3-pentafluorobutane (HFC-365mfc), 2,3-difluorobutane (HFC-392see), 1,1,1,2,2,3,3,4,4-nonafluorobutane(HFC-329p) 1,1,1-trifluoro-2methoxyethane (263fbEγβ), or bis(pentafluoroethyl) sulfide ($CF_3CF_2SCF_2CH_3$). These compositions are also useful as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents. The compositions are also useful as blowing agents in the preparation of thermoplastic and thermoset foams.

DETAILED DESCRIPTION

Figure 1:
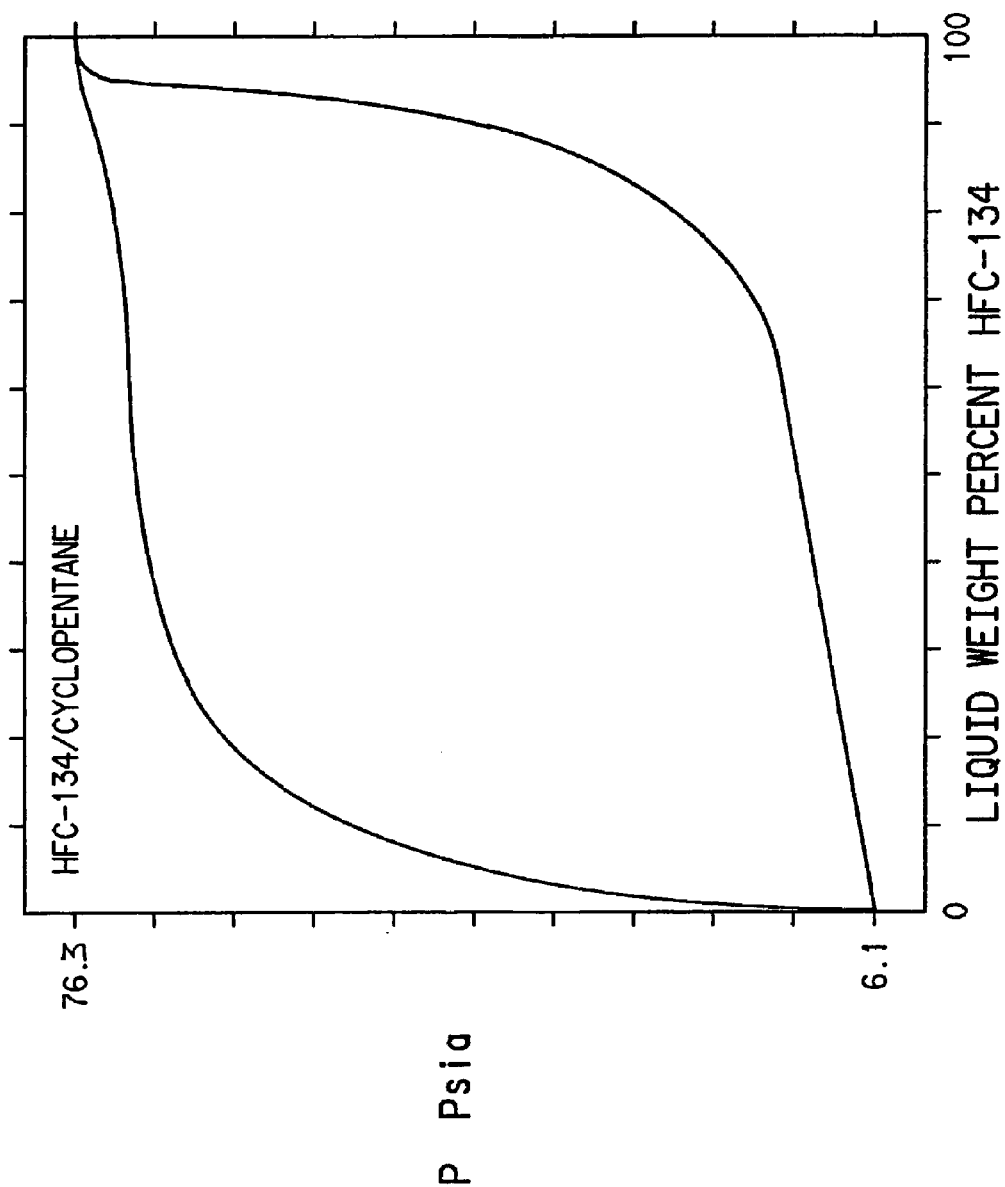
FIG. 1 is a graph of the vapor/liquid equilibrium curve for mixtures of HFC-134 and cyclopentane at 25° C.
Figure 2:
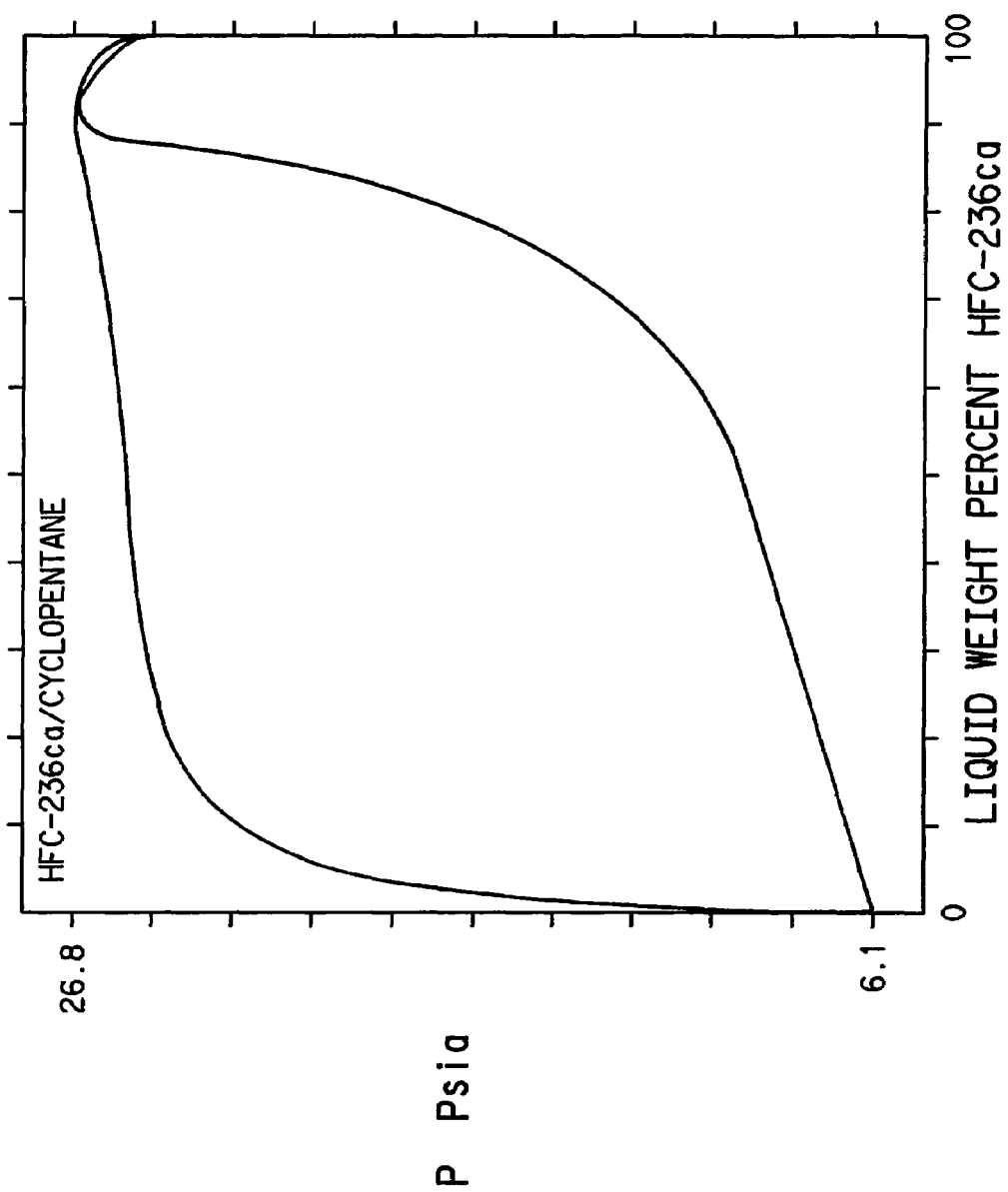
FIG. 2 is a graph of the vapor/liquid equilibrium curve for mixtures of HFC-236ca and cyclopentane at 25° C.
Figure 3:
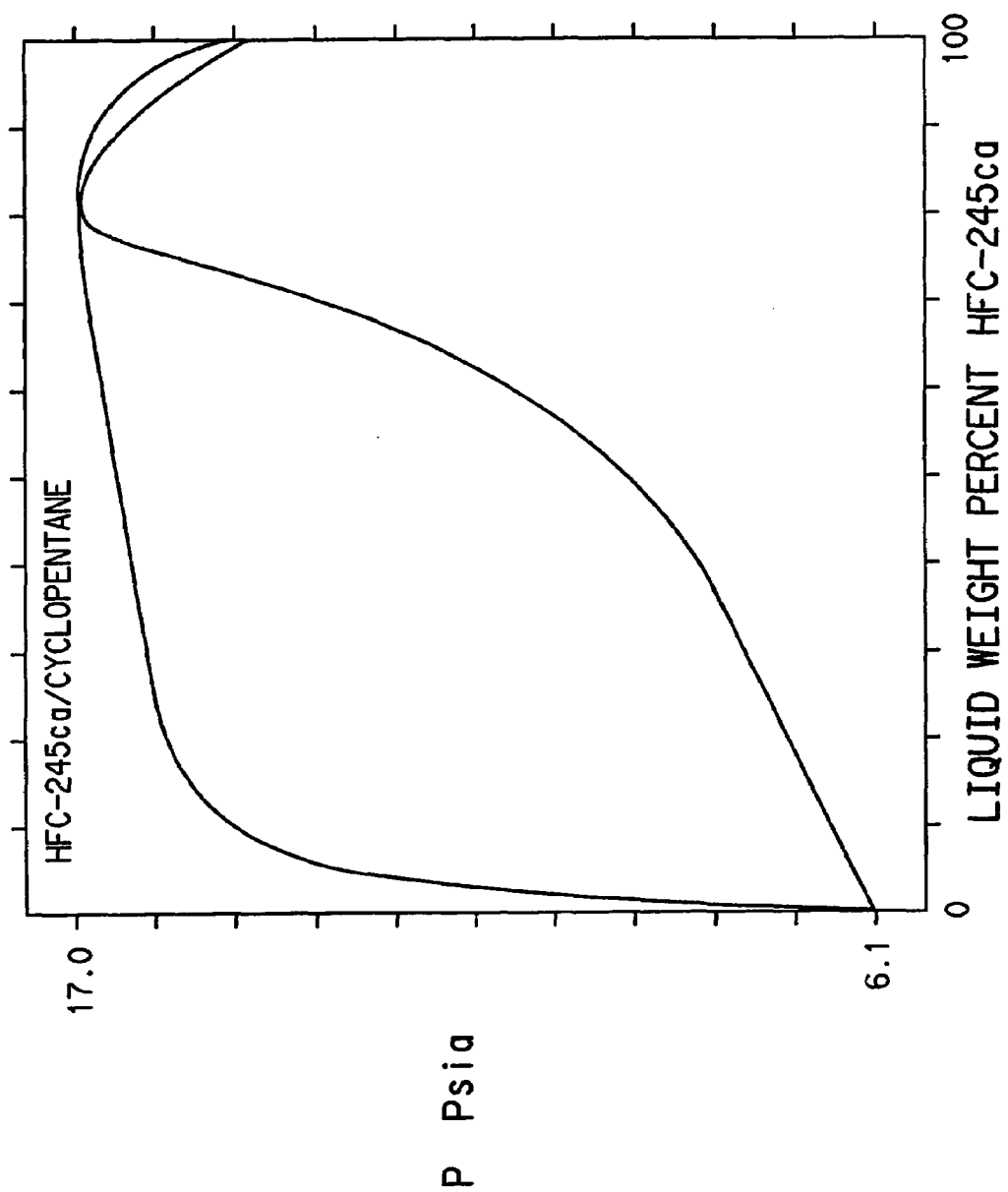
FIG. 3 is a graph of the vapor/liquid equilibrium curve for mixtures of HFC-245ca and cyclopentane at 25° C.
Figure 4:
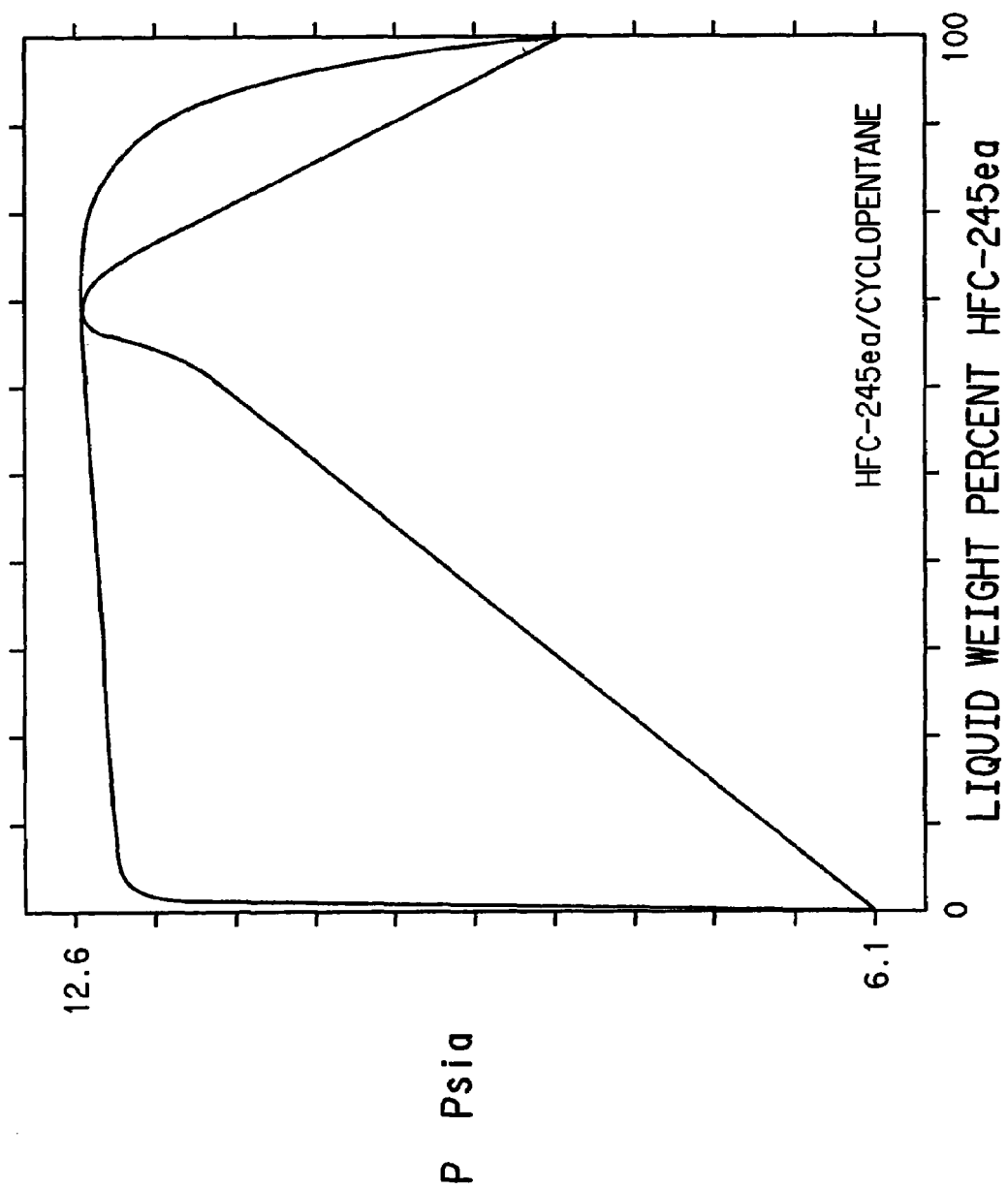
FIG. 4 is a graph of the vapor/liquid equilibrium curve for mixtures of HFC-245ea and cyclopentane at 25° C.
Figure 5:
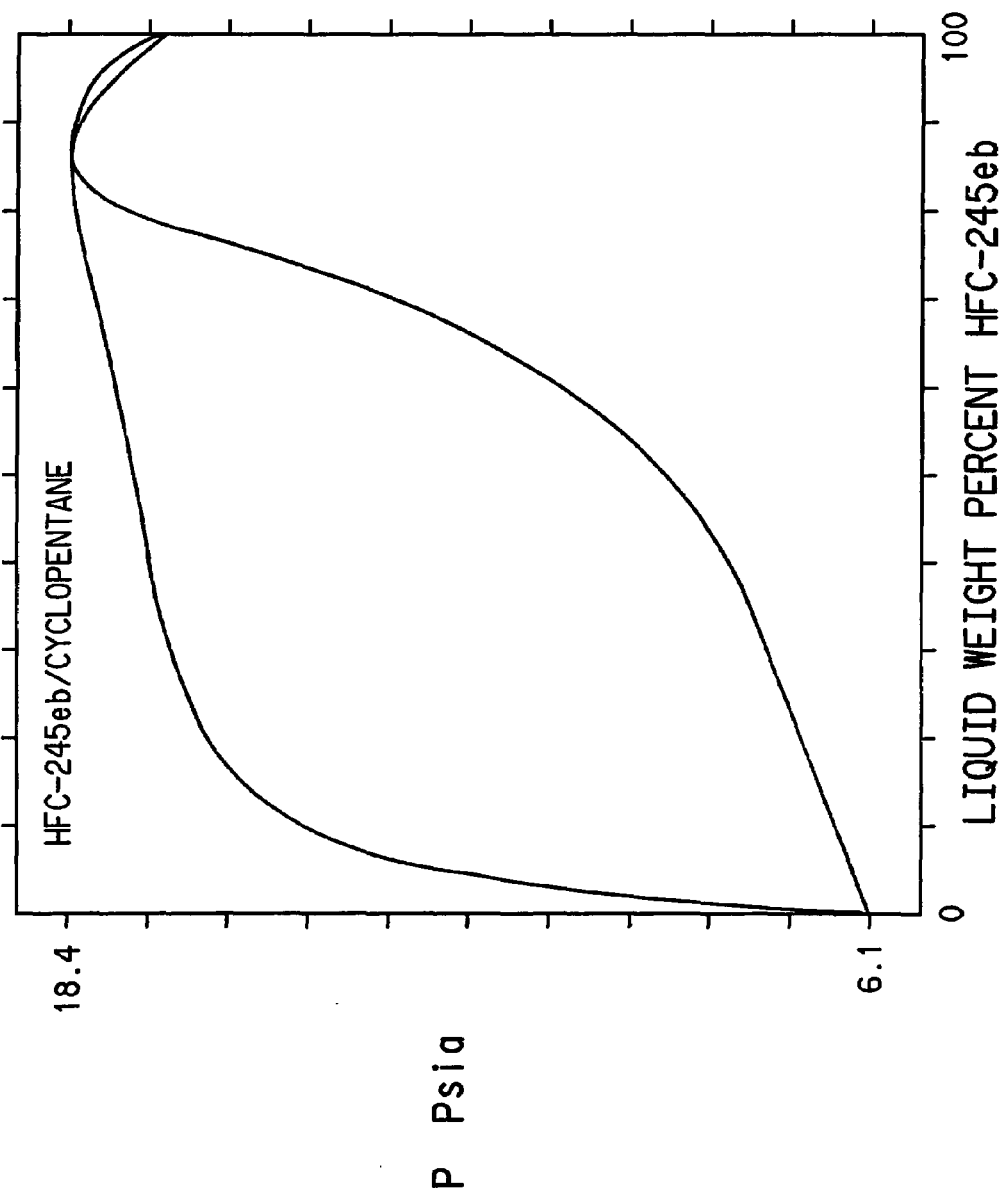
FIG. 5 is a graph of the vapor/liquid equilibrium curve for mixtures of HFC-245eb and cyclopentane at 25° C.
Figure 6:
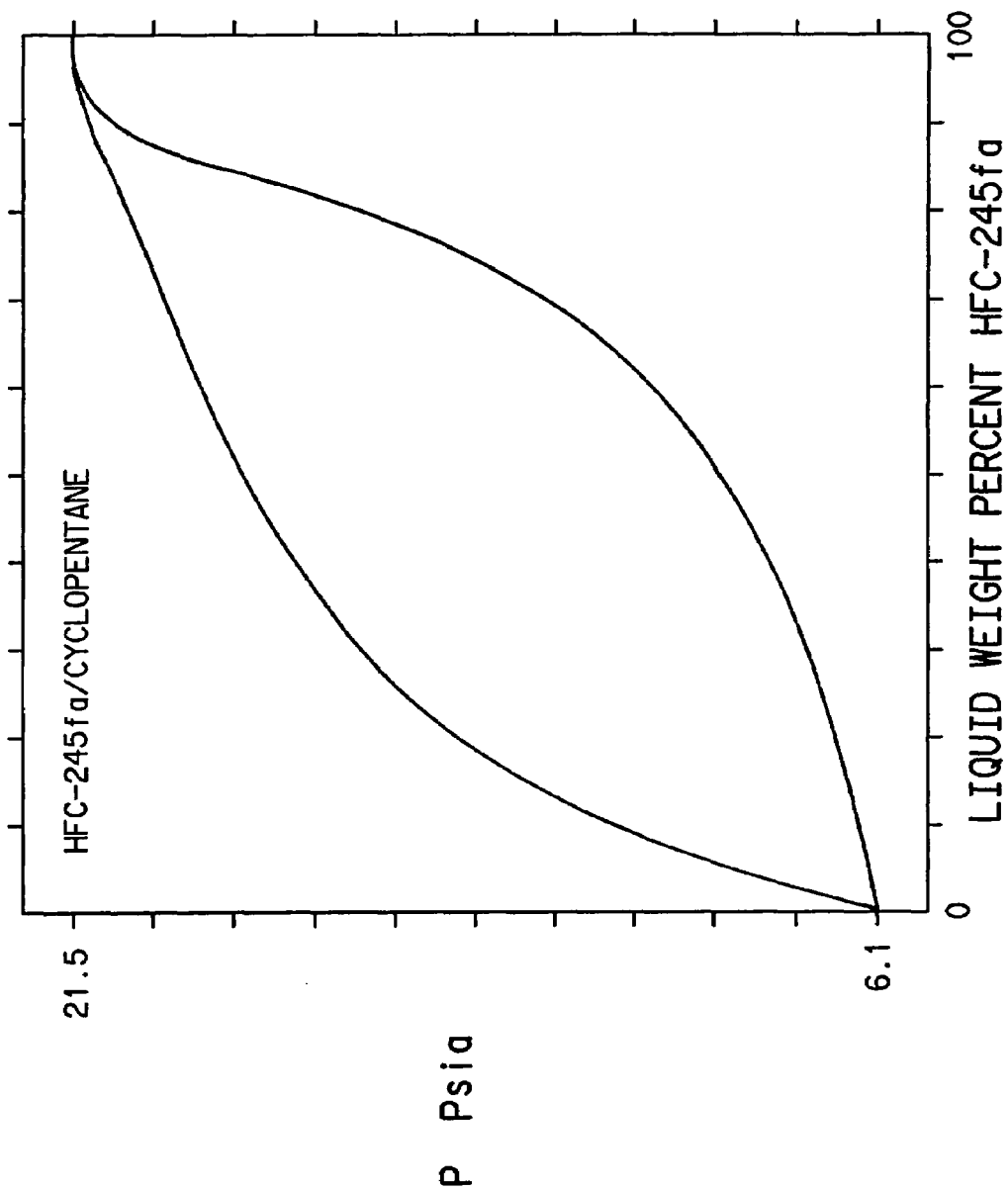
FIG. 6 is a graph of the vapor/liquid equilibrium curve for mixtures of HFC-245fa and cyclopentane at 25° C.
Figure 7:
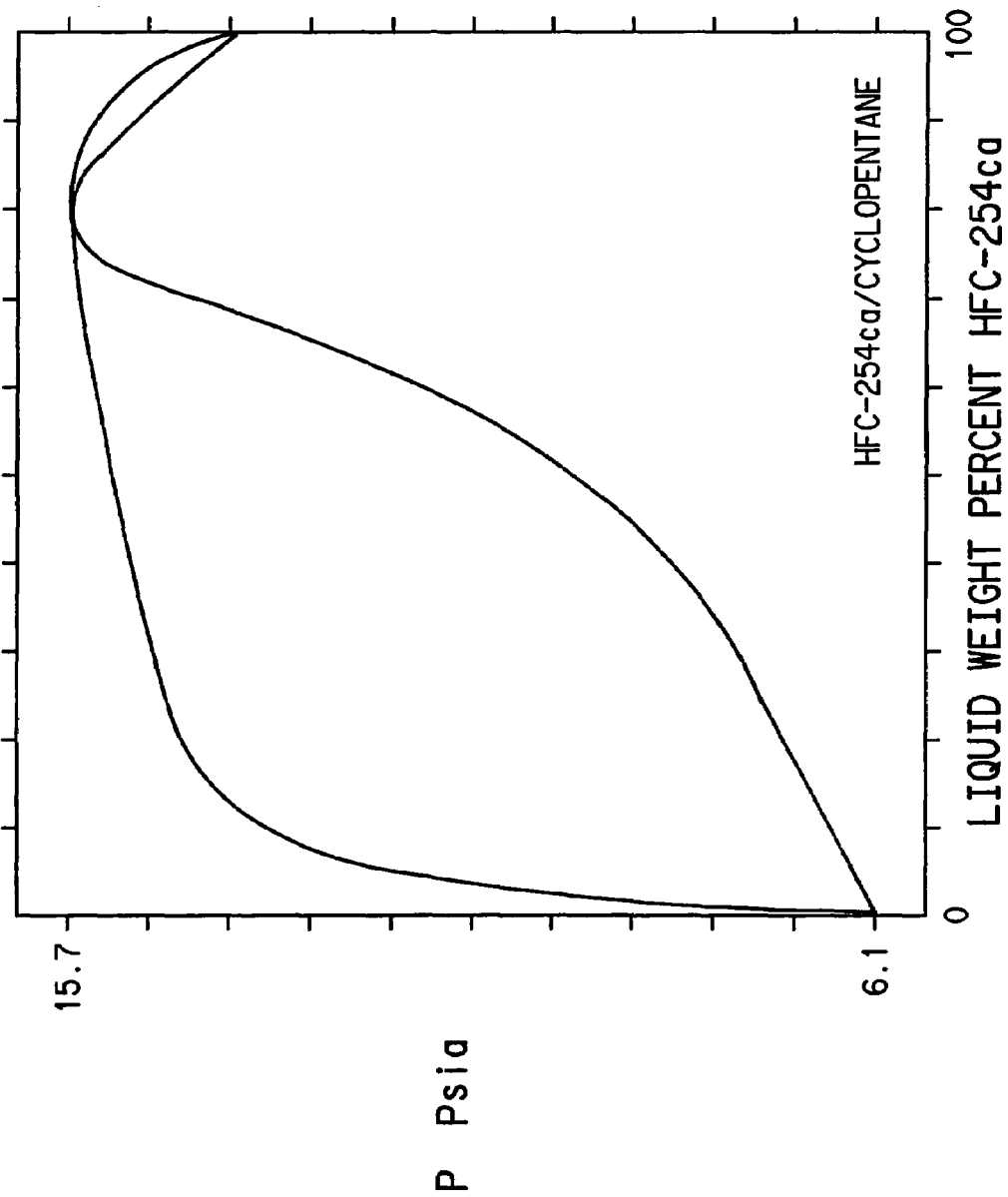
FIG. 7 is a graph of the vapor/liquid equilibrium curve for mixtures of HFC-254ca and cyclopentane at 25° C.
Figure 8:
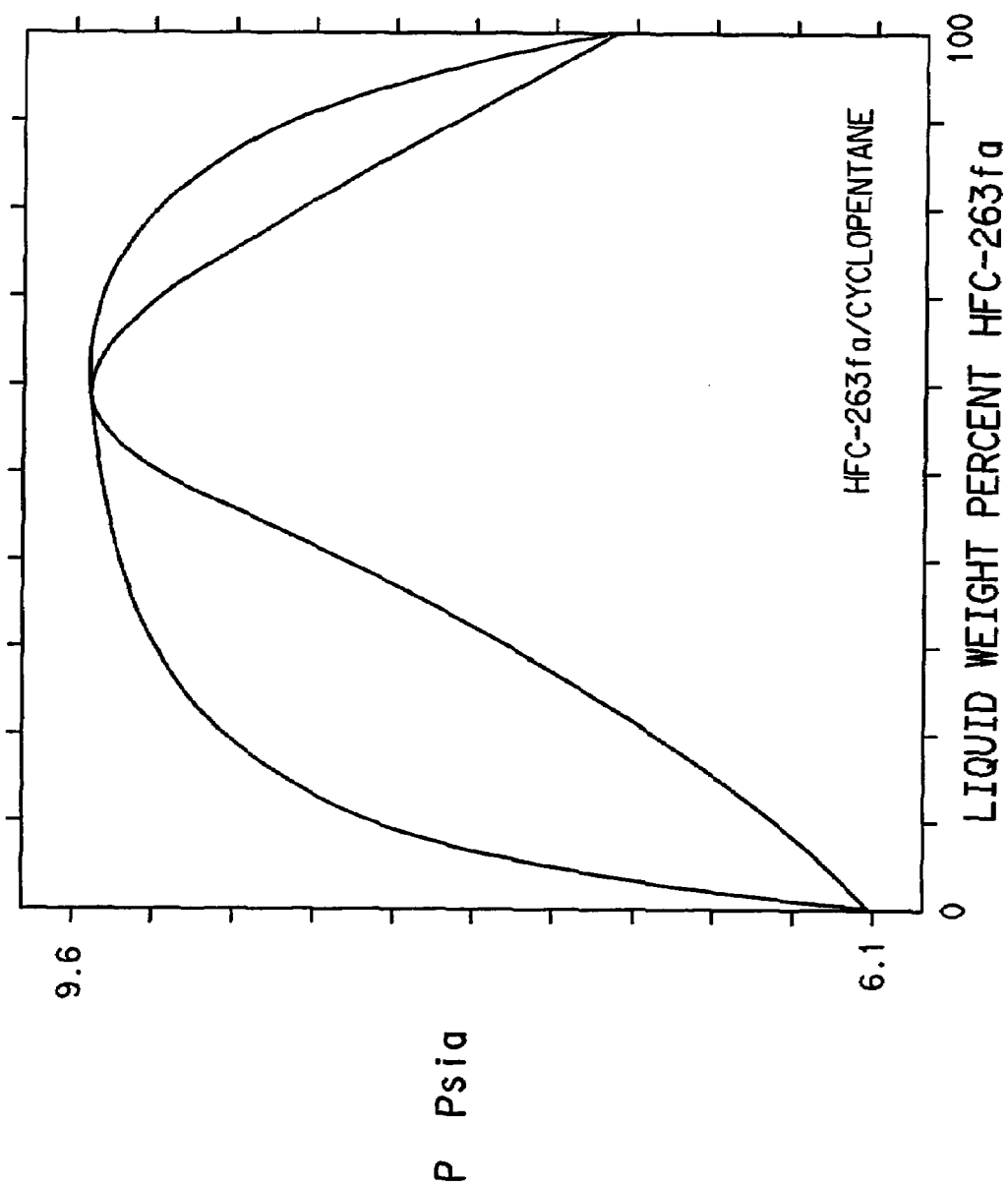
FIG. 8 is a graph of the vapor/liquid equilibrium curve for mixtures of HFC-263fa and cyclopentane at 25° C.

The present invention relates to the following compositions:

1,1,2,2-tetrafluoroethane (HFC-134) and cyclopentane, 1,1,2,2,3,3-hexafluoropropane (HFC-236ca) and cyclopentane, 1,1,2,2,3-pentafluoropropane (HFC-245ca) and cyclopentane, 1,1,2,3,3-pentafluoropropane (HFC-245ea) and cyclopentane, 1,1,1,2,3-pentafluoropropane (HFC-245eb) and cyclopentane, 1,1,1,3,3-pentafluoropropane (HFC-245fa) and cyclopentane, 1,2,2,3-tetrafluoropropane (HFC-254ca) and cyclopentane, 1,1,3-trifluoropropane (HFC-263fa) and cyclopentane, 1,2-difluoropropane (HFC-272ea) and cyclopentane, 1,3-difluoropropane (HFC-272fa) and cyclopentane, 1,1,1,2,2,3,3,4-octafluorobutane (HFC-338mcc) and cyclopentane, 1,1,1,2,3,4,4,4-octafluorobutane (HFC-338mee) and cyclopentane, 1,1,1,2,2,4,4,4-octafluorobutane (HFC-3 3 8mf) and cyclopentane, 1,1,1,2,2,4-hexafluorobutane (HFC-356mcf) and cyclopentane, 1,1,1,4,4,4-hexafluorobutane (HFC-356mff) and cyclopentane, 1,1,1,3,3-pentafluorobutane (HFC-365mfc) and cyclopentane, 1,1,1,2,2,3,3,4,4-nonafluorobutane (HFC-329p) and cyclopentane, 2,3-difluorobutane (HFC-392see) and cyclopentane, 1,1,1-trifluoro-2-methoxyethane (263 fbEβγ) and cyclopentane or bis(pentafluoroethyl)sulfide ($CF_3CF_2SCF_2CF_3$) and cyclopentane.

1-99 wt. % of each of the components of the compositions can be used as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents. Further, the present invention also relates to the discovery of azeotropic or azeotrope-like compositions of effective amounts of each of the above mixtures to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of HFC-134 and cyclopentane, HFC-236ca and cyclopentane, HFC-245ca and cyclopentane, HFC-245ea and cyclopentane, HFC-245eb and cyclopentane, HFC-245fa and cyclopentane, HFC-254ca and cyclopentane, HFC-263fa and cyclopentane, HFC-272ea and cyclopentane, HFC-272fa and cyclopentane, HFC-338mcc and cyclopentane, HFC-338mee and cyclopentane, HFC-338mf and cyclopentane, HFC-356mcf and cyclopentane, HFC-356mff and cyclopentane, HFC-365mfc and cyclopentane, HFC-329p and cyclopentane, HFC-392see and cyclopentane, 263fbEβγ and cyclopentane or $CF_3CF_2SCF_2CF_3$ and cyclopentane such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at 25° C.

| Components | Psia | kPa |
|---|---|---|
| cyclopentane | 6.14 | 42 |
| HFC-134 | 76.1 | 525 |
| HFC-236ca | 24.9 | 172 |
| HFC-245ca | 14.6 | 101 |
| HFC-245ea | 8.62 | 59 |
| HFC-245eb | 16.9 | 117 |
| HFC-245fa | 21.4 | 148 |
| HFC-254ca | 13.7 | 94 |
| HFC-263fa | 7.27 | 50 |
| HFC-272ea | 44.88 | 309 (50° C.) |
| HFC-272fa | 8.31 | 57 |
| HFC-338mcc | 14.7 | 101 |
| HFC-338mee | 14.7 | 101 |
| HFC-338mf | 18.8 | 130 |
| HFC-356mcf | 7.51 | 52 |
| HFC-356mff | 15.2 | 105 |
| HFC-365mfc | 8.75 | 60 |
| HFC-329p | 21.4 | 148 |
| HFC-392see | 7.63 | 53 |
| 263fbEβγ | 11.8 | 81 |
| $CF_3CF_2SCF_2CF_3$ | 9.51 | 66 |

Substantially constant boiling, azeotropic or azeotrope-like compositions of this invention comprise the following (all compositions are measured at 25° C.):

| COMPONENTS | WEIGHT RANGES (wt. %/wt/%) | PREFERRED (wt. %/wt. %) |
|---|---|---|
| HFC-134/cyclopentane | 64-99/1-36 | 80-99/1-20 |
| HFC-236ca/cyclopentane | 62-99/1-38 | 70-99/1-30 |
| HFC-245ca/cyclopentane | 51-99/1-49 | 60-99/1-40 |
| HFC-245ea/cyclopentane | 40-86/14-60 | 40-86/14-60 |
| HFC-245eb/cyclopentane | 54-99/1-46 | 60-99/1-40 |
| HFC-245fa/cyclopentane | 68-99/1-32 | 80-99/1-20 |
| HFC-254ca/cyclopentane | 47-99/1-53 | 60-99/1-40 |
| HFC-263fa/cyclopentane | 30-99/1-70 | 40-99/1-60 |
| HFC-272ea/cyclopentane (50° C.) | 51-99/1-49 | 80-99/1-20 |
| HFC-272fa/cyclopentane | 29-99/1-71 | 40-99/1-60 |

-continued

| COMPONENTS | WEIGHT RANGES (wt. %/wt/%) | PREFERRED (wt. %/wt. %) |
|---|---|---|
| HFC-338mcc/cyclopentane | 62-99/1-38 | 62-99/1-38 |
| HFC-338mee/cyclopentane | 59-99/1-41 | 59-99/1-41 |
| HFC-338mf/cyclopentane | 70-99/1-30 | 70-99/1-30 |
| HFC-356mcf/cyclopentane | 43-99/1-57 | 43-99/1-57 |
| HFC-356mff/cyclopentane | 67-99/1-33 | 80-99/1-20 |
| HFC-365mfc/cyclopentane | 37-99/1-63 | 50-99/1-50 |
| HFC-329p/cyclopentane | 68-99/1-32 | 80-99/1-20 |
| HFC-392see/cyclopentane | 23-99/1-77 | 40-99/1-60 |
| 263fbEβγ/cyclopentane | 52-99/1-48 | 60-99/1-40 |
| $CF_3CF_2SCF_2CF_3$/cyclopentane | 62-99/1-38 | 62-99/1-38 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D.á.á.) since the very term "azeotrope" is at once both definitive and limitative, and requires that effective amounts of A, B, C (and D.á.á.) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D.á.á.) Represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D.á.á.), while recognizing that such specific values point out only one particular relationship and that in actuality, a series of such relationships, represented by A, B, C (and D.á.á.) actually exist for a given azeotrope, varied by the influence of pressure.

An azeotrope of A, B, C (and D.á.á.) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study shows the following compositions are azeotropic, all at 25° C.

| Composition No. | Vapor Press. psia (kPa) | |
| --- | --- | --- |
| HFC-134/cyclopentane | 98.6/1.4 | 76.3 526 |
| HFC-236ca/cyclopentane | 91.5/8.5 | 26.8 185 |
| HFC-245ca/cyclopentane | 79.4/20.6 | 17.0 117 |
| HFC-245ea/cyclopentane | 69.0/31.0 | 12.6 87 |
| HFC-245eb/cyclopentane | 86.4/13.6 | 18.4 127 |
| HFC-245fa/cyclopentane | 97.2/2.8 | 21.5 148 |
| HFC-254ca/cyclopentane | 79.4/20.6 | 15.7 108 |
| HFC-263fa/cyclopentane | 58.8/41.2 | 9.63 66 |
| HFC-272ea/cyclopentane (50° C.) | 98.3/1.7 | 44.9 310 |
| HFC-272fa/cyclopentane | 58.0/42.0 | 10.6 73 |
| HFC-338mcc/cyclopentane | 89.5/10.5 | 16.0 110 |
| HFC-338mee/cyclopentane | 88.4/11.6 | 16.3 112 |
| HFC-338mf/cyclopentane | 97.0/3.0 | 19.0 131 |
| HFC-356mcf/cyclopentane | 71.3/28.7 | 9.78 67 |
| HFC-356mff/cyclopentane | 99.9/0.1 | 15.2 105 |
| HFC-365mfc/cyclopentane | 82.4/17.6 | 9.30 64 |
| HFC-329p/cyclopentane | 94.3/5.7 | 22.2 153 |
| HFC-392see/cyclopentane | 62.4/37.6 | 8.79 61 |
| 263fbEβγ/cyclopentane | 86.9/13.1 | 12.2 84 |
| $CF_3CF_2SCF_2CF_3$/cyclopentane | 85.6/14.4 | 11.4 79 |

EXAMPLE 2

Impact of Vapor Leakage on Vapor Pressure at 25° C.

A vessel is charged with an initial composition at 25° C., and the initial vapor pressure of the composition is measured. The composition is allowed to leak from the vessel, while the temperature is held constant at 25° C., until 50 weight percent of the initial composition is removed, at which time the vapor pressure of the composition remaining in the vessel is measured. The results are summarized below.

| | INITIAL | | 50% LEAK | | |
| --- | --- | --- | --- | --- | --- |
| WT % A/WT % B | PSIA | KPA | PSIA | KPA | DELTA % P |
| HFC-134/cyclopentane | | | | | |
| 98.6/1.4 | 76.3 | 526 | 76.3 | 526 | 0.0 |
| 99/1 | 76.2 | 525 | 76.2 | 525 | 0.0 |
| 80/20 | 73.3 | 505 | 71.8 | 495 | 2.0 |
| 64/36 | 71.9 | 496 | 65.0 | 448 | 9.6 |
| 63/37 | 71.8 | 495 | 63.6 | 439 | 11.4 |
| HFC-236ca/cyclopentane | | | | | |
| 91.5/8.5 | 26.8 | 185 | 26.8 | 185 | 0.0 |
| 99/1 | 25.6 | 177 | 25.2 | 174 | 1.6 |
| 70/30 | 26.1 | 180 | 25.4 | 175 | 2.7 |
| 62/38 | 25.8 | 178 | 23.8 | 164 | 7.8 |
| 61/39 | 25.8 | 178 | 23.1 | 159 | 10.5 |
| HFC-245ca/cyclopentane | | | | | |
| 79.4/20.6 | 17.0 | 117 | 17.0 | 117 | 0.0 |
| 90/10 | 16.8 | 116 | 16.5 | 114 | 1.8 |
| 99/1 | 15.1 | 104 | 14.8 | 102 | 2.0 |
| 60/40 | 16.6 | 114 | 16.2 | 112 | 2.4 |
| 51/49 | 16.5 | 114 | 15.2 | 105 | 7.9 |
| 50/50 | 16.5 | 114 | 14.7 | 101 | 10.9 |
| HFC-245ea/cyclopentane | | | | | |
| 69.0/31.0 | 12.6 | 87 | 12.6 | 87 | 0.0 |
| 86/14 | 12.3 | 85 | 11.3 | 78 | 8.1 |
| 87/13 | 12.3 | 85 | 11.0 | 76 | 10.6 |
| 40/60 | 12.5 | 86 | 11.6 | 80 | 7.2 |
| HFC-245eb/cyclopentane | | | | | |
| 86.4/13.6 | 18.4 | 127 | 18.4 | 127 | 0.0 |
| 95/5 | 18.0 | 124 | 17.8 | 123 | 1.1 |
| 99/1 | 17.2 | 119 | 17.1 | 118 | 0.6 |
| 60/40 | 17.8 | 123 | 17.0 | 117 | 4.5 |
| 54/46 | 17.6 | 121 | 15.9 | 110 | 9.7 |
| 53/47 | 17.6 | 121 | 15.5 | 107 | 11.9 |
| HFC-245fa/cyclopentane | | | | | |
| 97.2/2.8 | 21.52 | 148.4 | 21.52 | 148.4 | 0.0 |
| 99/1 | 21.49 | 148.2 | 21.49 | 148.2 | 0.0 |
| 80/20 | 20.52 | 141.5 | 19.82 | 136.7 | 3.4 |
| 68/32 | 19.64 | 135.4 | 17.83 | 122.9 | 9.2 |
| 67/33 | 19.56 | 134.9 | 17.60 | 121.3 | 10.0 |
| 90/10 | 21.24 | 146.4 | 21.09 | 145.4 | 0.7 |
| HFC-254ca/cyclopentane | | | | | |
| 79.4/20.6 | 15.7 | 108 | 15.7 | 108 | 0.0 |
| 85/15 | 15.7 | 108 | 15.6 | 108 | 0.6 |
| 99/1 | 14.0 | 97 | 13.8 | 95 | 1.4 |
| 60/40 | 15.5 | 107 | 15.1 | 104 | 2.6 |
| 47/53 | 15.2 | 105 | 13.9 | 96 | 8.6 |
| 46/54 | 15.2 | 105 | 13.6 | 94 | 10.5 |
| HFC-263fa/cyclopentane | | | | | |
| 58.8/41.2 | 9.63 | 66 | 9.63 | 66 | 0.0 |
| 80/20 | 9.29 | 64 | 8.89 | 61 | 4.3 |
| 90/10 | 8.66 | 60 | 8.00 | 55 | 7.6 |
| 99/1 | 7.46 | 51 | 7.32 | 50 | 1.9 |
| 40/60 | 9.49 | 65 | 9.25 | 64 | 2.5 |
| 30/70 | 9.32 | 64 | 8.42 | 58 | 9.7 |
| 29/71 | 9.29 | 64 | 8.28 | 57 | 10.9 |
| HFC-272ea/cyclopentane (50° C.) | | | | | |
| 98.3/1.6 | 44.90 | 309.6 | 44.90 | 309.6 | 0.0 |
| 99/1 | 44.89 | 309.5 | 44.89 | 309.5 | 0.0 |
| 80/20 | 43.73 | 301.5 | 43.22 | 298.0 | 1.2 |
| 60/40 | 41.21 | 284.1 | 38.79 | 267.4 | 5.9 |
| 51/49 | 39.90 | 275.1 | 35.85 | 247.2 | 10.2 |
| 90/10 | 44.61 | 307.6 | 44.53 | 307.0 | 0.2 |
| HFC-272fa/cyclopentane | | | | | |
| 58.0/42.0 | 10.6 | 73 | 10.6 | 73 | 0.0 |
| 80/20 | 10.2 | 70 | 9.81 | 68 | 3.8 |
| 99/1 | 8.48 | 58 | 8.36 | 58 | 1.4 |
| 40/60 | 10.5 | 72 | 10.3 | 71 | 1.9 |

| | INITIAL | | 50% LEAK | | |
|---|---|---|---|---|---|
| WT % A/WT % B | PSIA | KPA | PSIA | KPA | DELTA % P |
| 29/71 | 10.3 | 71 | 9.28 | 64 | 9.9 |
| 28/72 | 10.3 | 71 | 9.08 | 63 | 11.8 |
| HFC-338mcc/cyclopentane | | | | | |
| 89.5/10.5 | 16.0 | 110 | 16.0 | 110 | 0.0 |
| 99/1 | 15.0 | 103 | 14.9 | 103 | 0.7 |
| 62/38 | 15.2 | 105 | 13.8 | 95 | 9.2 |
| 61/39 | 15.1 | 104 | 13.5 | 93 | 10.6 |
| HFC-338mee/cyclopentane | | | | | |
| 88.4/11.6 | 16.3 | 112 | 16.3 | 112 | 0.0 |
| 99/1 | 15.1 | 104 | 14.9 | 103 | 1.3 |
| 59/41 | 15.5 | 107 | 14.0 | 97 | 9.7 |
| 58/42 | 15.5 | 107 | 13.5 | 93 | 12.9 |
| HFC-338mf/cyclopentane | | | | | |
| 97.0/3.0 | 19.0 | 131 | 19.0 | 131 | 0.0 |
| 99/1 | 18.9 | 130 | 18.9 | 130 | 0.0 |
| 80/20 | 17.9 | 123 | 17.1 | 118 | 4.5 |
| 70/30 | 17.2 | 119 | 15.5 | 107 | 9.9 |
| 69/31 | 17.1 | 118 | 15.2 | 105 | 11.1 |
| 90/10 | 18.6 | 128 | 18.4 | 127 | 1.1 |
| HFC-356mcf/cyclopentane | | | | | |
| 71.3/28.7 | 9.78 | 67 | 9.78 | 67 | 0.0 |
| 85/15 | 9.56 | 66 | 9.30 | 64 | 2.7 |
| 99/1 | 7.81 | 54 | 7.61 | 52 | 2.6 |
| 43/57 | 9.48 | 65 | 8.62 | 59 | 9.1 |
| 42/58 | 9.46 | 65 | 8.50 | 59 | 10.1 |
| HFC-356mff/cyclopentane | | | | | |
| 99.9/0.1 | 15.2 | 105 | 15.2 | 105 | 0.0 |
| 80/20 | 14.3 | 99 | 13.8 | 95 | 3.5 |
| 70/30 | 13.6 | 94 | 12.6 | 87 | 7.4 |
| 67/33 | 13.4 | 92 | 12.2 | 84 | 9.0 |
| 66/34 | 13.4 | 92 | 12.0 | 83 | 10.4 |
| HFC-365mfc/cyclopentane | | | | | |
| 82.4/17.6 | 9.30 | 64 | 9.30 | 64 | 0.0 |
| 90/10 | 9.23 | 64 | 9.20 | 63 | 0.3 |
| 99/1 | 8.82 | 61 | 8.80 | 61 | 0.2 |
| 60/40 | 9.00 | 62 | 8.77 | 60 | 2.6 |
| 37/63 | 8.32 | 57 | 7.50 | 52 | 9.9 |
| 36/64 | 8.29 | 57 | 7.44 | 51 | 10.3 |
| 50/50 | 8.74 | 60 | 8.29 | 57 | 5.1 |
| HFC-329p/cyclopentane | | | | | |
| 94.3/5.7 | 22.2 | 153 | 22.2 | 153 | 0.0 |
| 99/1 | 21.7 | 150 | 21.6 | 149 | 0.5 |
| 80/20 | 21.4 | 148 | 20.7 | 143 | 3.3 |
| 68/32 | 20.8 | 143 | 19.0 | 131 | 8.7 |
| 67/33 | 20.8 | 143 | 18.6 | 128 | 10.6 |
| HFC-329see/cyclopentane | | | | | |
| 62.4/37.6 | 8.79 | 61 | 8.79 | 61 | 0.0 |
| 80/20 | 8.61 | 59 | 8.51 | 59 | 1.2 |
| 99/1 | 7.71 | 53 | 7.68 | 53 | 0.4 |
| 40/60 | 8.59 | 59 | 8.39 | 58 | 2.3 |
| 23/77 | 8.14 | 56 | 7.33 | 51 | 10.0 |
| 263fbEβγ/cyclopentane | | | | | |
| 86.9/13.1 | 12.2 | 84 | 12.2 | 84 | 0.0 |
| 99/1 | 11.9 | 82 | 11.8 | 81 | 0.8 |
| 60/40 | 11.6 | 80 | 11.0 | 76 | 5.2 |
| 52/48 | 11.3 | 78 | 10.2 | 70 | 9.7 |
| 51/49 | 11.3 | 78 | 10.1 | 70 | 10.6 |
| $CF_3CF_2SCF_2CF_3$/cyclopentane | | | | | |
| 85.6/14.4 | 11.4 | 79 | 11.4 | 79 | 0.0 |
| 99/1 | 9.96 | 69 | 9.71 | 67 | 2.5 |
| 62/38 | 10.9 | 75 | 9.94 | 69 | 8.8 |
| 61/39 | 10.9 | 75 | 9.77 | 67 | 10.4 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 50° C.

A leak test is performed on compositions of HFC-272fa and cyclopentane, at the temperature of 50° C. The results are summarized below.

| WT % | INITIAL | | 50% LEAK | | |
|---|---|---|---|---|---|
| A/WT % B | PSIA | KPA | PSIA | KPA | DELTA % P |
| HFC-272fa/cyclopentane | | | | | |
| 56.9/43.1 | 25.0 | 172 | 25.0 | 172 | 0.0 |
| 80/20 | 24.0 | 165 | 23.0 | 159 | 4.0 |
| 90/10 | 22.5 | 155 | 21.0 | 145 | 6.7 |
| 99/1 | 19.9 | 137 | 19.6 | 135 | 1.5 |
| 40/60 | 24.7 | 170 | 24.3 | 168 | 1.6 |
| 28/72 | 24.2 | 167 | 21.8 | 150 | 9.9 |
| 27/73 | 24.1 | 166 | 21.4 | 148 | 11.2 |

These results show that compositions of HFC-272fa and cyclopentane are azeotropic or azeotrope-like at different temperatures, but that the weight percents of the components vary as the temperature is changed.

EXAMPLE 4

Refrigerant Performance

The following table shows the performance of various refrigerants. The data are based on the following conditions.

| | |
|---|---|
| Evaporator temperature | 45.0° F. (7.2° C.) |
| Condenser temperature | 130.0° F. (54.4° C.) |
| Subcooled | 15.0° F. (8.3° C.) |
| Return gas | 65.0° F. (18.3° C.) |

Compressor efficiency is 75%.

The refrigeration capacity is based on a compressor with a fixed displacement of 3.5 cubic feet per minute and 75% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Capacity Refrig. BTU/min Psia (kPa) | Evap. Press. Psia (kPa) | Cond. Press. Psia (kPa) | Temp. °F. (°C.) | COP | Comp. Dis. (kw)ááá | | Comp. |
|---|---|---|---|---|---|---|---|
| HFC-134/cyclopentane | | | | | | | |
| 1/99 0.3 | 3.0 | 21 | 17.6 | 121 | 152.3 | 66.8 | 3.86 | 18.7 |
| 99/1 3.1 | 38.3 | 264 | 160.9 | 1109 | 184.2 | 84.6 | 3.57 | 176.3 |
| HFC-236ca/cyclopentane | | | | | | | |
| 1/99 0.3 | 3.0 | 21 | 17.3 | 119 | 152.3 | 66.8 | 3.84 | 18.3 |
| 99/1 1.1 | 12.8 | 88 | 60.9 | 420 | 151.2 | 66.2 | 3.61 | 63.9 |
| HFC-245ca/cyclopentane | | | | | | | |
| 1/99 0.3 | 3.0 | 21 | 17.2 | 119 | 152.4 | 66.9 | 3.82 | 18.0 |
| 99/1 0.7 | 6.9 | 48 | 36.4 | 251 | 157.9 | 69.9 | 3.74 | 38.8 |
| HFC-245ea/cyclopentane | | | | | | | |
| 1/99 0.3 | 2.9 | 20 | 17.1 | 118 | 152.5 | 66.9 | 3.81 | 17.9 |
| 99/1 0.4 | 3.9 | 27 | 23.5 | 162 | 167.5 | 75.3 | 3.83 | 24.6 |
| HFC-245eb/cyclopentane | | | | | | | |
| 1/99 0.3 | 3.0 | 21 | 17.2 | 119 | 152.4 | 66.9 | 3.82 | 18.1 |
| 99/1 0.8 | 8.4 | 58 | 42.6 | 294 | 156.4 | 69.1 | 3.72 | 45.5 |
| HFC-245fa/cyclopentane | | | | | | | |
| 1/99 0.3 | 3.0 | 21 | 17.2 | 119 | 152.3 | 66.8 | 3.83 | 18.2 |
| 99/1 1.0 | 11.0 | 76 | 53.2 | 367 | 154.7 | 68.2 | 3.67 | 56.8 |
| HFC-254ca/cyclopentane | | | | | | | |
| 1/99 0.3 | 2.9 | 20 | 17.1 | 118 | 152.5 | 66.9 | 3.82 | 18.0 |
| 99/1 0.7 | 6.7 | 46 | 35.0 | 241 | 161.3 | 71.8 | 3.77 | 37.8 |
| HFC-263fa/cyclopentane | | | | | | | |
| 1/99 0.3 | 2.9 | 20 | 17.0 | 117 | 152.6 | 67.0 | 3.81 | 17.9 |
| 99/1 0.4 | 3.2 | 22 | 19.7 | 136 | 177.5 | 80.8 | 3.88 | 21.0 |

| Capacity Refrig. BTU/min Psia (kPa) | Evap. Press. Psia (kPa) | Cond. Press. Psia (kPa) | Temp. °F. (°C.) | COP | Comp. Dis. (kw)ááá | | Comp. |
|---|---|---|---|---|---|---|---|
| HFC-272ea/cyclopentane | | | | | | | |
| 1/99 0.3 | 3.0 | 21 | 17.6 | 119 | 152.6 | 67.0 | 3.82 | 18.1 |
| 99/1 1.0 | 10.5 | 72 | 50.3 | 347 | 171.0 | 77.2 | 3.80 | 56.9 |
| HFC-272fa/cyclopentane | | | | | | | |
| 1/99 0.3 | 2.9 | 20 | 17.1 | 118 | 152.7 | 67.1 | 3.81 | 17.9 |
| 99/1 0.4 | 3.8 | 26 | 22.1 | 152 | 180.3 | 82.4 | 3.89 | 24.0 |
| HFC-338mcc/cyclopentane | | | | | | | |
| 1/99 0.3 | 3.0 | 21 | 17.4 | 120 | 151.8 | 66.6 | 3.86 | 18.6 |
| 99/1 0.7 | 7.4 | 51 | 38.8 | 268 | 132.3 | 55.7 | 3.45 | 37.2 |
| HFC-338mee/cyclopentane | | | | | | | |
| 1/99 0.3 | 3.0 | 21 | 17.3 | 119 | 152.1 | 66.7 | 3.84 | 18.4 |
| 99/1 0.7 | 7.4 | 51 | 39.2 | 270 | 135.1 | 57.3 | 3.48 | 37.7 |
| HFC-338mf/cyclopentane | | | | | | | |
| 1/99 0.3 | 3.1 | 21 | 17.5 | 121 | 151.5 | 66.4 | 3.89 | 18.9 |
| 99/1 0.8 | 9.7 | 67 | 48.4 | 334 | 131.2 | 55.1 | 3.39 | 46.0 |
| HFC-356mcf/cyclopentane | | | | | | | |
| 1/99 0.3 | 2.9 | 20 | 17.1 | 118 | 152.4 | 66.9 | 3.81 | 18.0 |
| 99/1 0.4 | 3.5 | 24 | 20.9 | 144 | 142.1 | 61.2 | 3.67 | 20.5 |
| HFC-356mff/cyclopentane | | | | | | | |
| 1/99 0.3 | 3.0 | 21 | 17.2 | 119 | 152.1 | 66.7 | 3.84 | 18.3 |
| 99/1 0.7 | 7.3 | 50 | 38.4 | 265 | 137.8 | 58.8 | 3.54 | 37.9 |
| HFC-365mfc/cyclopentane | | | | | | | |
| 1/99 0.3 | 3.0 | 21 | 17.1 | 118 | 152.3 | 66.8 | 3.82 | 18.0 |
| 99/1 0.4 | 4.2 | 29 | 23.4 | 161 | 142.7 | 61.5 | 3.67 | 23.6 |
| HFC-329p/cyclopentane | | | | | | | |
| 1/99 0.3 | 3.1 | 21 | 17.6 | 121 | 150.9 | 66.1 | 3.93 | 19.3 |
| 99/1* 0.9 | 11.2 | 77 | 54.7 | 377 | 134.7 | 57.1 | 3.28 | 50.4 |

*70° F. Return Gas

| Capacity Refrig. BTU/min Psia (kPa) | Evap. Press. Psia (kPa) | Cond. Press. Psia (kPa) | Temp. °F. (°C.) | COP | Comp. Dis. (kw)ááá | | Comp. |
|---|---|---|---|---|---|---|---|
| HFC-392see/cyclopentane | | | | | | | |
| 1/99 0.3 | 2.9 | 20 | 17.0 | 117 | 152.6 | 67.0 | 3.80 | 17.9 |

-continued

| Capacity Refrig. BTU/min Psia (kPa) | Evap. Press. Psia (kPa) | Cond. Press. °F (°C) | Temp. | COP | Comp. Dis. (kw)ááá | Comp. |
|---|---|---|---|---|---|---|
| 99/1 0.4 | 3.5 | 24 20.2 | 139 | 158.9 | 70.5 3.82 | 21.4 |

263fbEβγ/cyclopentane

| | | | | | | |
|---|---|---|---|---|---|---|
| 1/99 0.3 | 2.9 | 20 17.1 | 118 | 152.5 | 66.9 3.81 | 17.9 |
| 99/1 0.6 | 5.5 | 38 31.2 | 215 | 159.5 | 70.8 3.77 | 32.6 |

$CF_3CF_2SCF_2CF_3$/cyclopentane

| | | | | | | |
|---|---|---|---|---|---|---|
| 1/99 0.3 | 3.0 | 21 17.3 | 119 | 152.0 | 66.7 3.85 | 18.3 |
| 99/1* 0.4 | 4.7 | 32 27.5 | 190 | 130.2 | 54.6 3.34 | 24.2 |

*70° F. Return Gas

EXAMPLE 5

This Example is directed to measurements of the liquid/vapor equilibrium curves for the mixtures in FIGS. 1-8 and 10-20.

Turning to FIG. 1, the upper curve represents the composition of the liquid, and the lower curve represents the composition of the vapor.

The data for the compositions of the liquid in FIG. 1 are obtained as follows. A stainless steel cylinder is evacuated, and a weighed amount of HFC-134 is added to the cylinder. The cylinder is cooled to reduce the vapor pressure of HFC-134, and then a weighed amount of cyclopentane is added to the cylinder. The cylinder is agitated to mix the HFC-134 and cyclopentane, and then the cylinder is placed in a constant temperature bath until the temperature comes to equilibrium at 25° C., at which time the vapor pressure of the HFC-134 and cyclopentane in the cylinder is measured. Additional samples of liquid are measured the same way, and the results are plotted in FIG. 1.

The curve which shows the composition of the vapor is calculated using an ideal gas equation of state.

Vapor/liquid equilibrium data are obtained in the same way for the mixtures shown in FIGS. 1-8 and 10-20.

The data in FIGS. 1-8 and 10-20 show that at 25° C., there are ranges of compositions that have vapor pressures higher than the vapor pressures of the pure components of the composition at that same temperature. As stated earlier, the higher than expected pressures of these compositions may result in an unexpected increase in the refrigeration capacity and efficiency for these compositions versus the pure components of the compositions.

Figure 9:
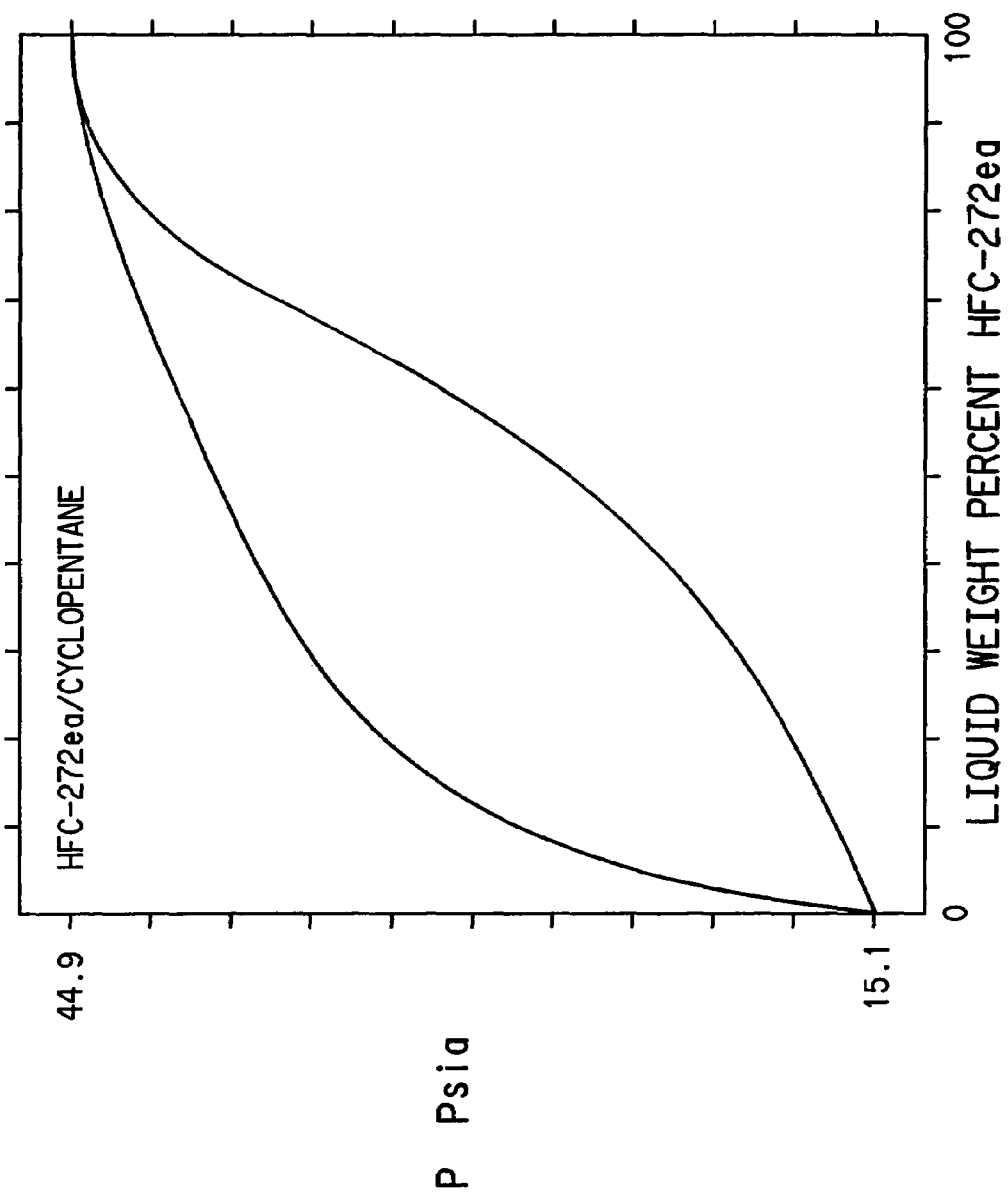
FIG. 9 is a graph of the vapor/liquid equilibrium curve for mixtures of HFC-272ea and cyclopentane at 50° C.
Figure 10:
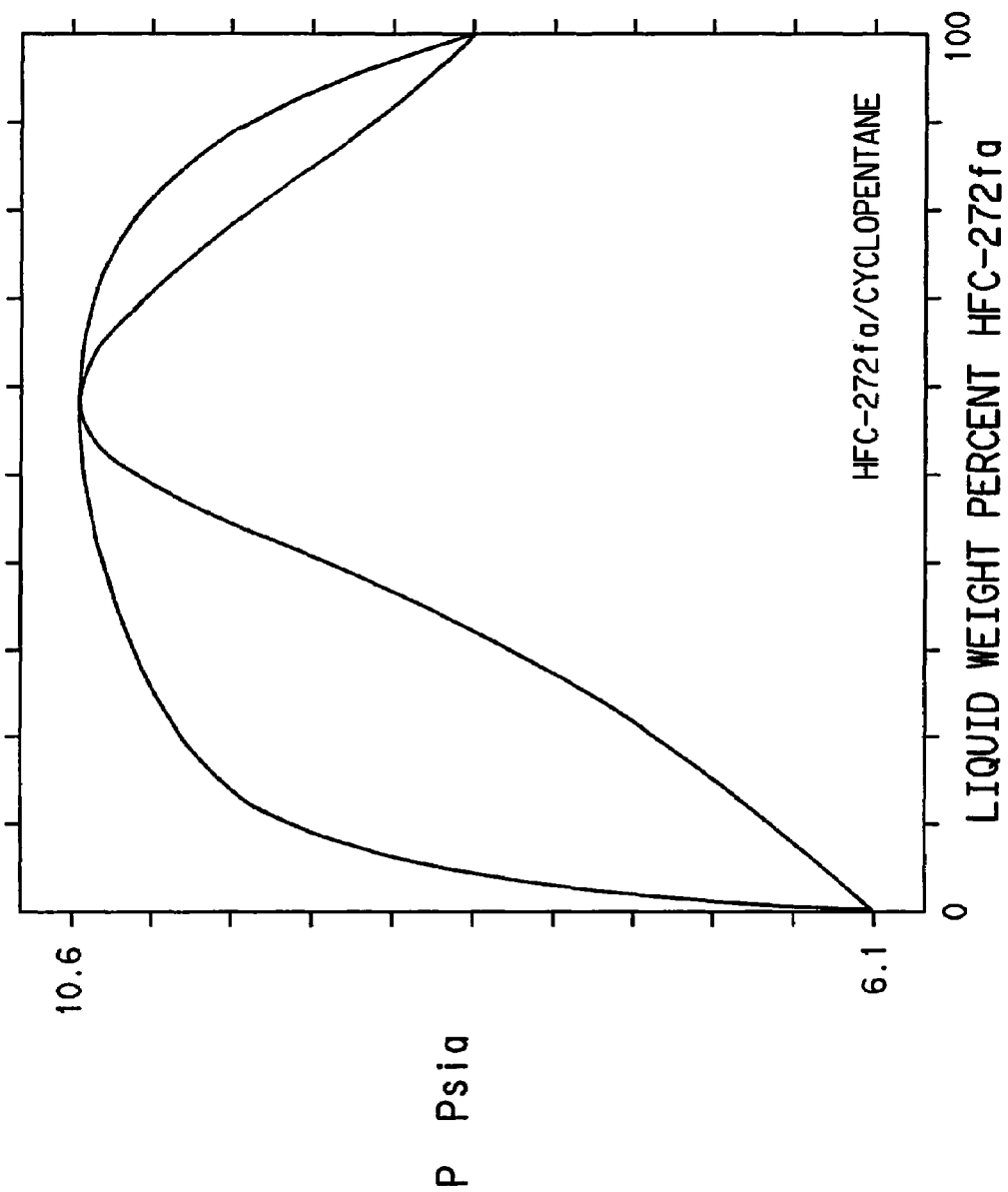
FIG. 10 is a graph of the vapor/liquid equilibrium curve for mixtures of HFC-272fa and cyclopentane at 25° C.
Figure 11:
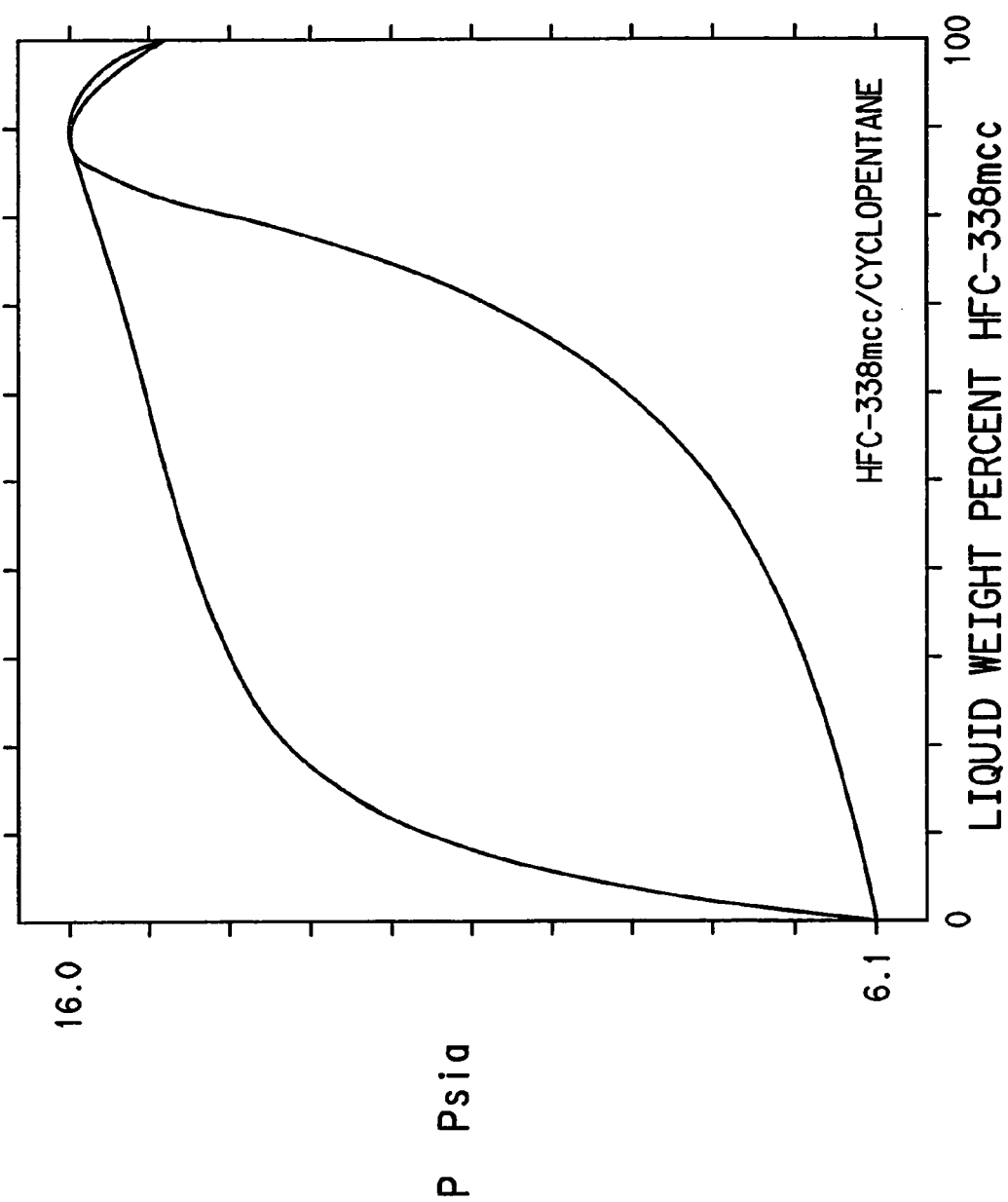
FIG. 11 is a graph of the vapor/liquid equilibrium curve for mixtures of HFC-338mcc and cyclopentane at 25° C.
Figure 12:
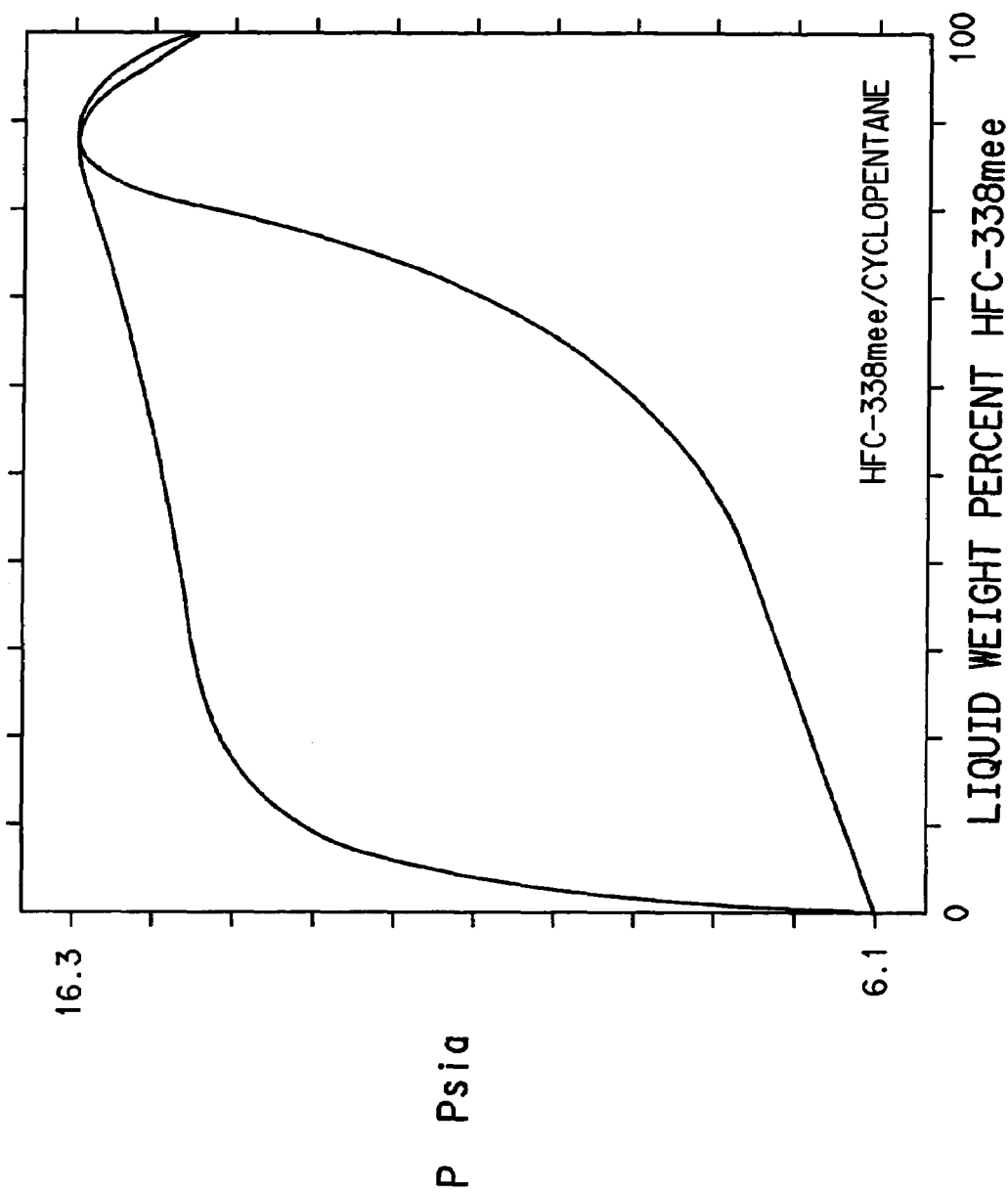
FIG. 12 is a graph of the vapor/liquid equilibrium curve for mixtures of HFC-338mee and cyclopentane at 25° C.
Figure 13:
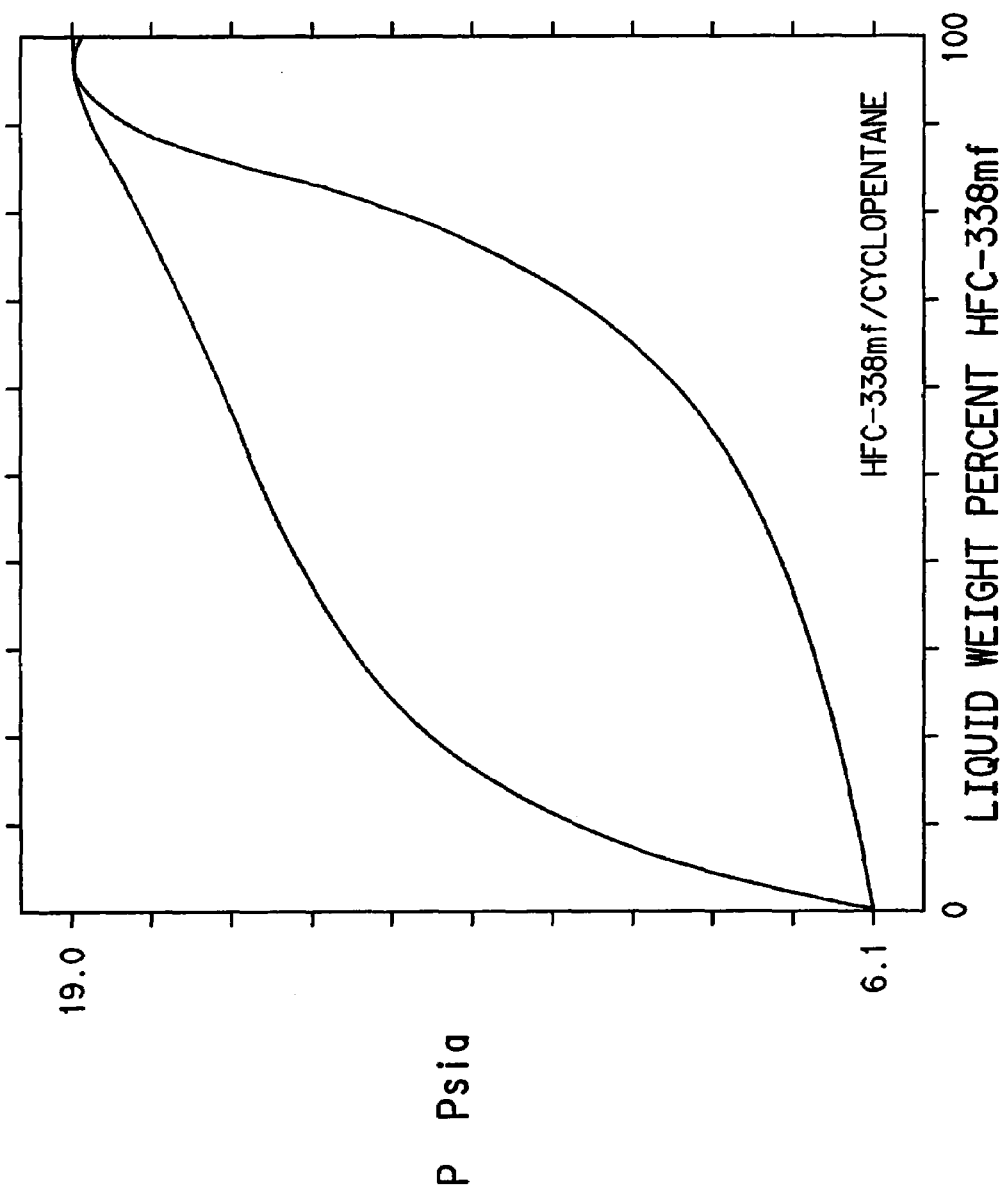
FIG. 13 is a graph of the vapor/liquid equilibrium curve for mixtures of HFC-338mf and cyclopentane at 25° C.
Figure 14:
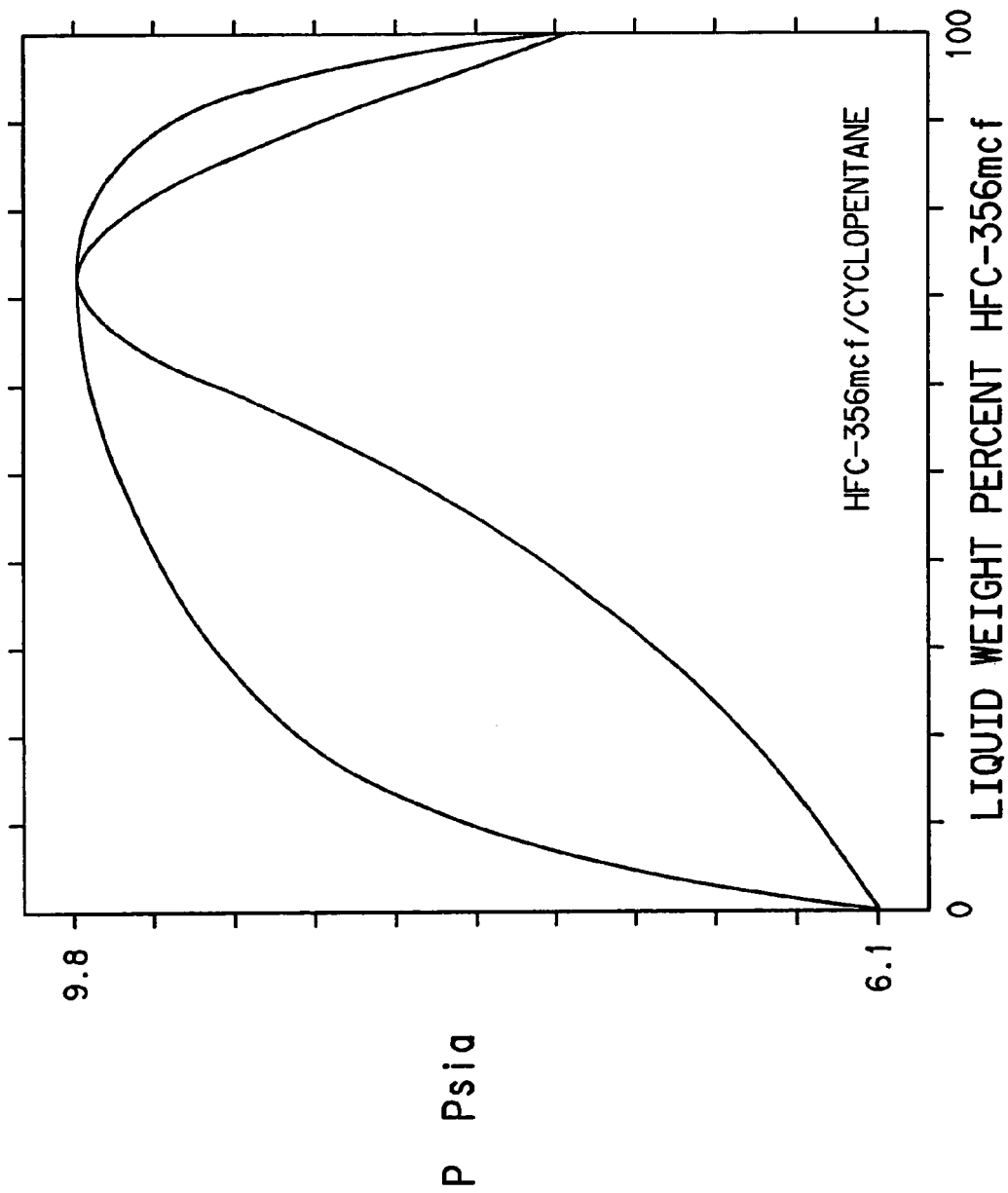
FIG. 14 is a graph of the vapor/liquid equilibrium curve for mixtures of HFC-356mcf and cyclopentane at 25° C.
Figure 15:
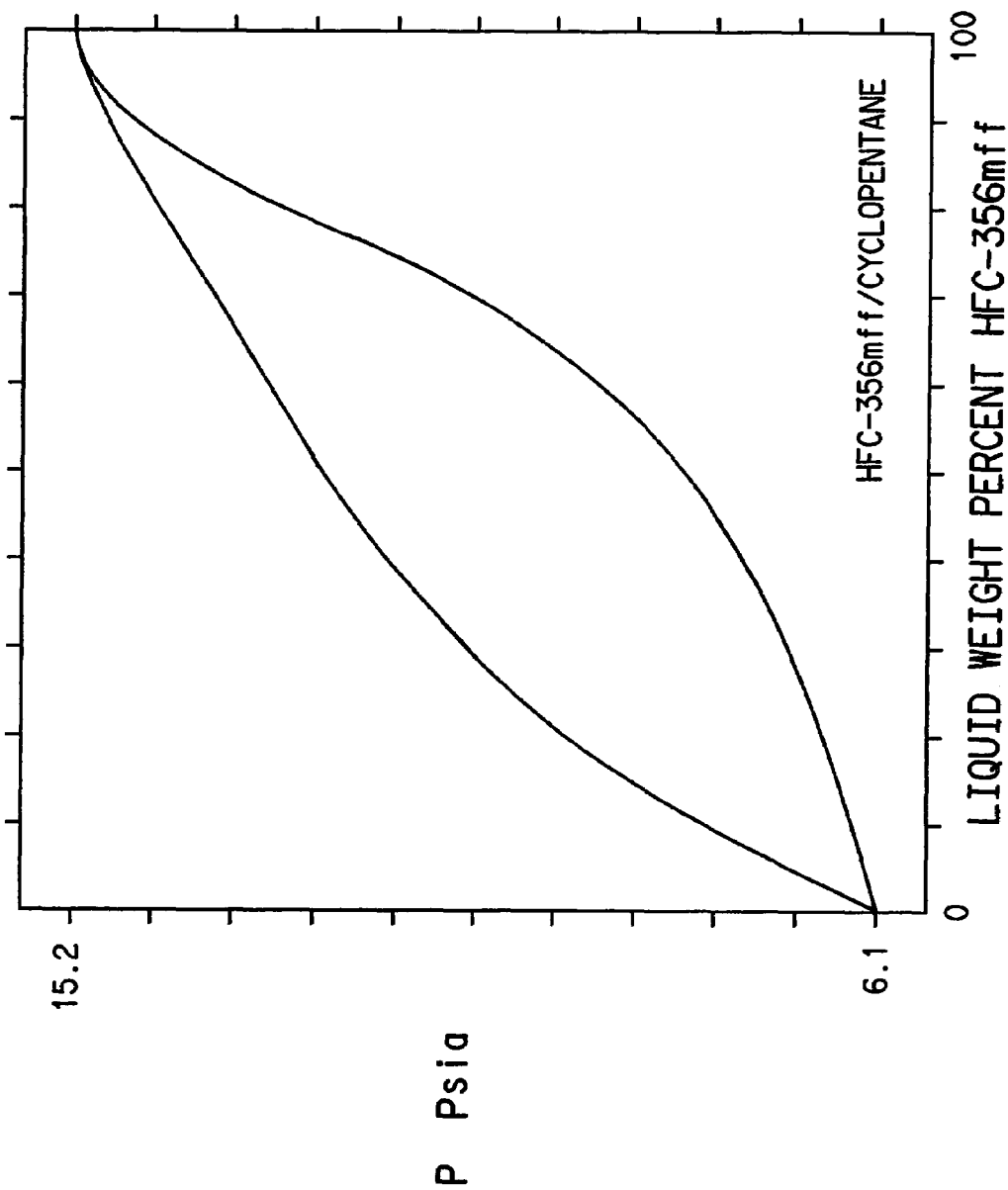
FIG. 15 is a graph of the vapor/liquid equilibrium curve for mixtures of HFC-356mff and cyclopentane at 25° C.
Figure 16:
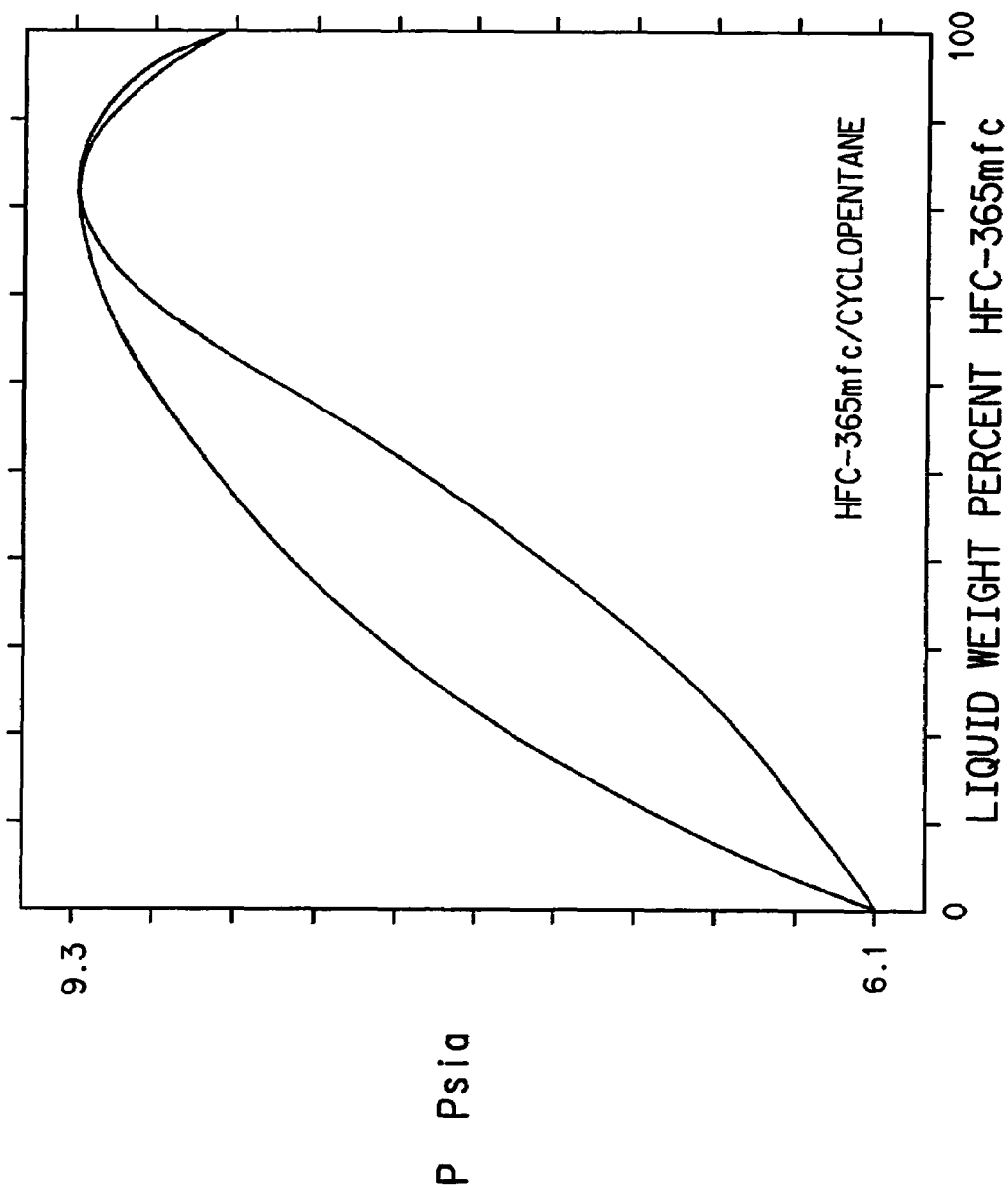
FIG. 16 is a graph of the vapor/liquid equilibrium curve for mixtures of HFC-365mfc and cyclopentane at 25° C.
Figure 17:
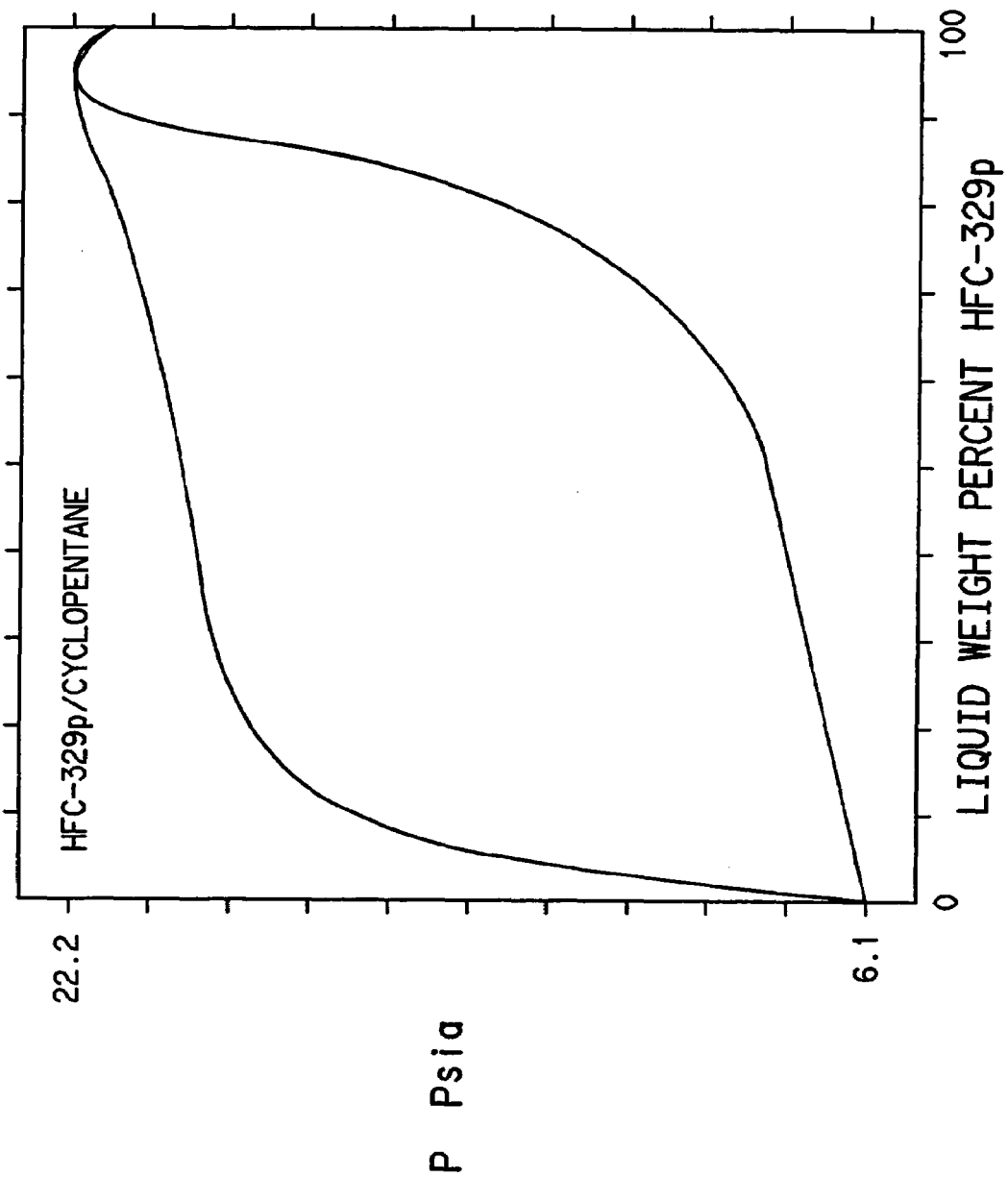
FIG. 17 is a graph of the vapor/liquid equilibrium curve for mixtures of HFC-329p and cyclopentane at 25° C.
Figure 18:
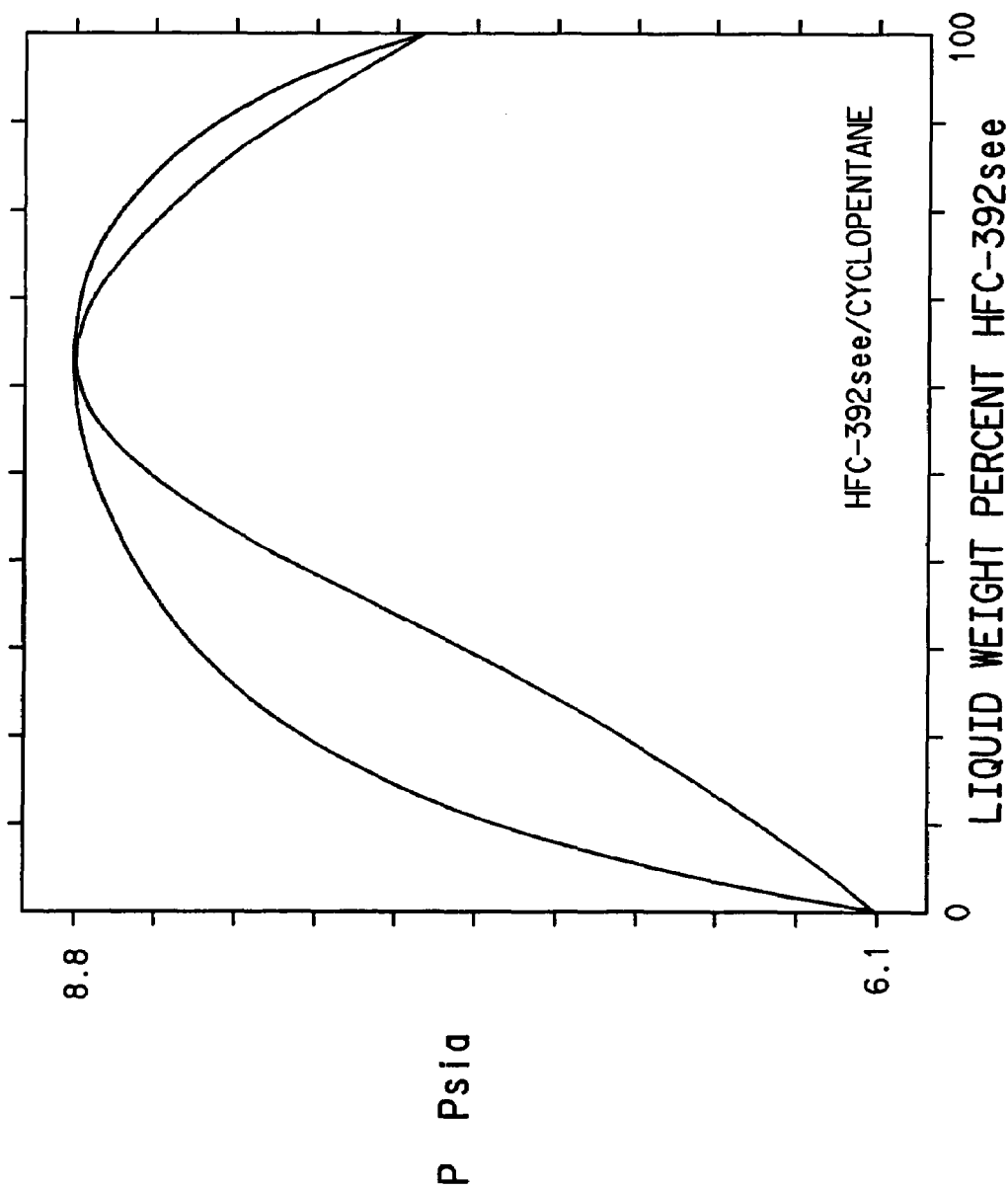
FIG. 18 is a graph of the vapor/liquid equilibrium curve for mixtures of HFC-392see and cyclopentane at 25° C.
Figure 19:
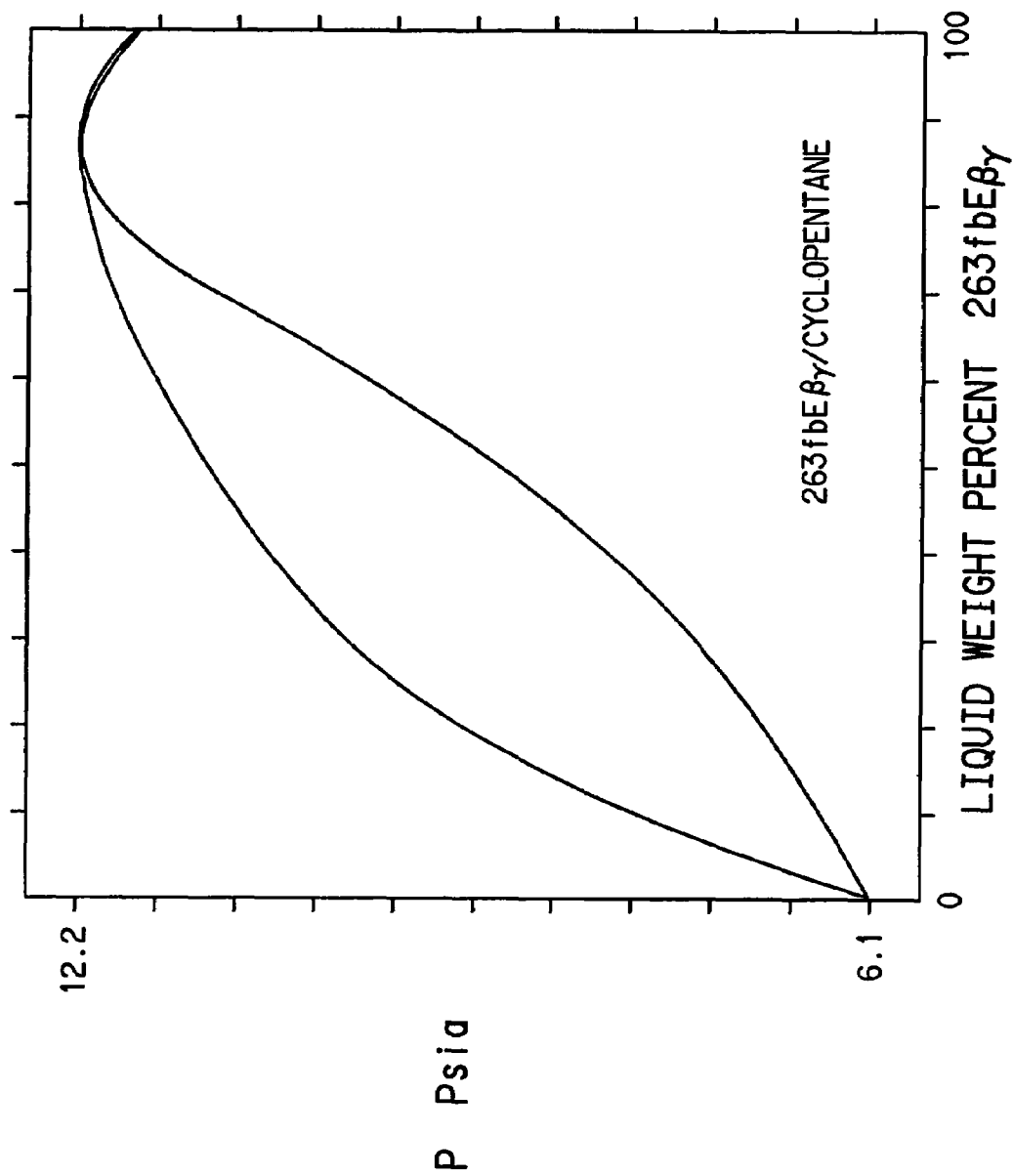
FIG. 19 is a graph of the vapor/liquid equilibrium curve for mixtures of 263fbEγβ and cyclopentane at 25° C.
Figure 20:
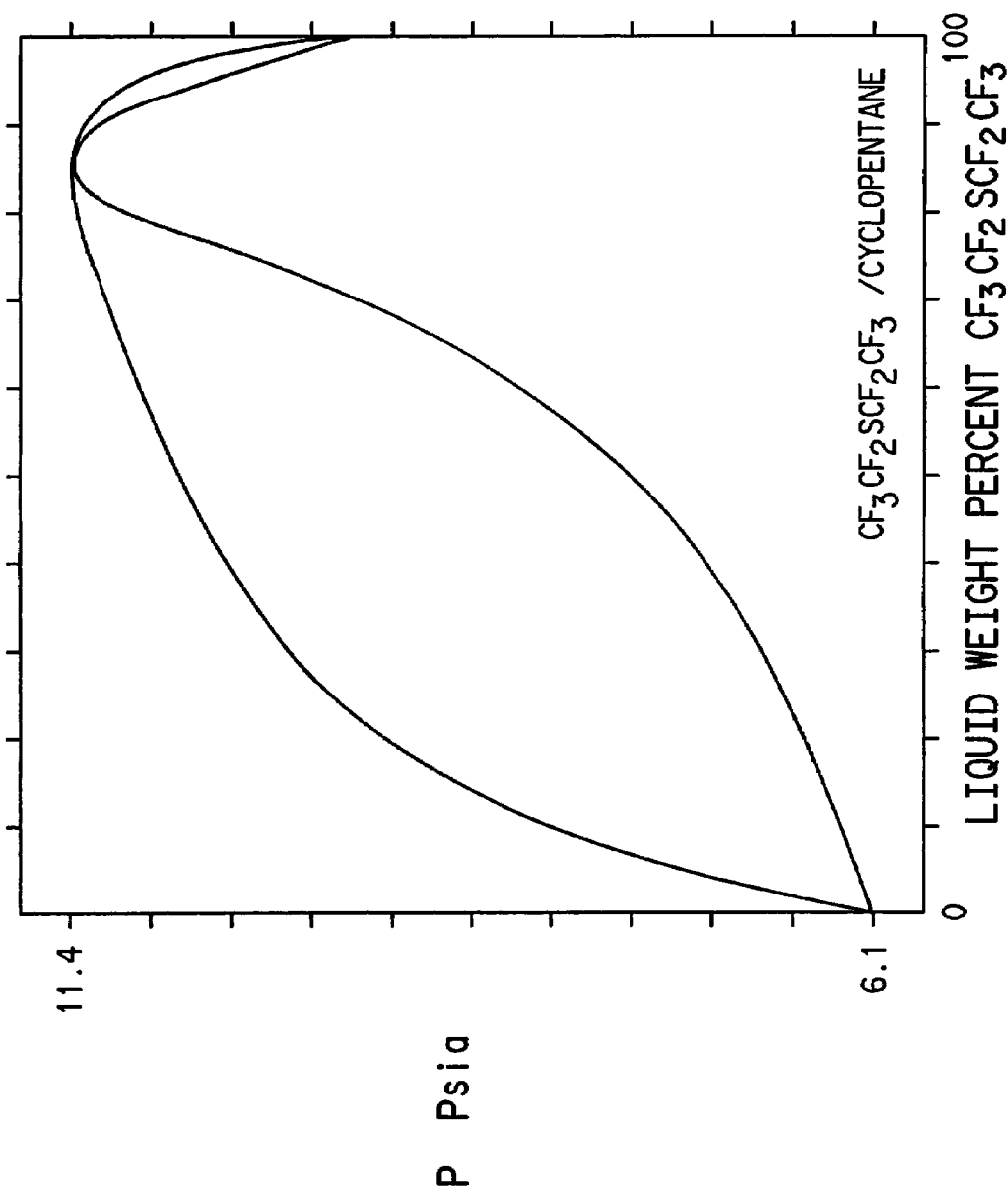
FIG. 20 is a graph of the vapor/liquid equilibrium curve for mixtures of $CF_3CF_2SCF_2CF_3$ and cyclopentane at 25° C.

Turning to FIG. 9, the data show that at 50° C., there are ranges of compositions that have vapor pressures higher than the vapor pressures of the pure components of the composition at that same temperature.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

Additional Compounds

Other components, such as aliphatic hydrocarbons having a boiling point of −60 to +100° C., hydrofluorocarbonalkanes having a boiling point of −60 to +100° C., hydrofluoropropanes having a boiling point of between −60 to +100° C., hydrocarbon esters having a boiling point between −60 to +100° C, hydrochlorofluorocarbons having a boiling point between −60 to +100° C., hydrofluorocarbons having a boiling point of −60 to +100° C., hydrochlorocarbons having a boiling point between −60 to +100° C., chlorocarbons and perfluorinated compounds, can be added to the azeotropic or azeotrope-like compositions described above without substantially changing the properties thereof, including the constant boiling behavior, of the compositions.

Additives such as lubricants, corrosion inhibitors, surfactants, stabilizers, dyes and other appropriate materials may be added to the novel compositions of the invention for a variety of purposes provides they do not have an adverse influence on the composition for its intended application. Preferred lubricants include esters having a molecular weight greater than 250.

What is claimed is:

1. An azeotrope-like composition consisting essentially of: 64-80 weight percent 1,1,2,2-tetrafluoroethane and 20-36 weight percent cyclopentane.

2. A process for producing refrigeration, comprising condensing a composition of claim 1 and thereafter evaporating said composition in the vicinity of a body to be cooled.

3. A process for producing heat comprising condensing a composition of claim 1 in the vicinity of a body to be heated, and thereafter evaporating said composition.

4. A process for preparing a thermoset or a thermoplastic foam, comprising using a composition of claim 1 as an expansion agent for polyolefins or polyurethanes.

* * * * *